(12) United States Patent
Hirai

(10) Patent No.: US 9,618,102 B2
(45) Date of Patent: Apr. 11, 2017

(54) ELECTROMECHANICAL ACTUATOR AND ACTUATOR UNIT

(71) Applicant: NABTESCO CORPORATION, Tokyo (JP)

(72) Inventor: Masanori Hirai, Fuwa-gun (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/513,524

(22) Filed: Oct. 14, 2014

(65) Prior Publication Data

US 2015/0114151 A1    Apr. 30, 2015

(30) Foreign Application Priority Data

Oct. 24, 2013  (JP) .................................. 2013-221165

(51) Int. Cl.
| | |
|---|---|
| *F16H 25/20* | (2006.01) |
| *F15B 15/08* | (2006.01) |
| *B64C 13/28* | (2006.01) |
| *F15B 9/12* | (2006.01) |

(52) U.S. Cl.
CPC ........... *F16H 25/205* (2013.01); *B64C 13/28* (2013.01); *F15B 9/12* (2013.01); *F15B 15/088* (2013.01); *Y10T 74/18592* (2015.01)

(58) Field of Classification Search
CPC ........... F16H 25/205; F16H 2025/2081; F16H 2025/2075; F15B 2015/1495; F15B 9/12; F15B 13/10; F15B 15/088; F15B 2211/8757; B64C 13/28; B64C 13/36; B64C 13/42; B64C 13/50; B64C 2013/506; Y10T 74/18592
USPC ...... 74/89.23, 89.25, 89.26, 89.32; 244/78.1, 244/99.2, 99.4, 99.9, 221, 228, 229; 91/380; 92/136
See application file for complete search history.

(56) References Cited

U.S. PATENT DOCUMENTS

| | | | | |
|---|---|---|---|---|
| 2,660,028 | A | * | 11/1953 | Geyer ...................... F15B 13/10 310/76 |
| 3,075,503 | A | * | 1/1963 | Kimsey .................... B23Q 5/36 418/69 |
| 3,527,143 | A | * | 9/1970 | Hayter .................... B64C 13/42 244/99.4 |

(Continued)

*Primary Examiner* — William C Joyce
*Assistant Examiner* — Leonard J Archuleta
(74) *Attorney, Agent, or Firm* — Studebaker & Brackett PC

(57) ABSTRACT

An actuator is driven even if a jammed state, a motor stop, or the like occurs. An electromechanical actuator includes: an electric motor attached to a housing; a conversion mechanism portion having a drive portion that is driven to rotate by the electric motor and a driven portion that is driven by the drive portion and advances and withdraws in a predetermined advancing and withdrawing direction, the conversion mechanism portion being accommodated in the housing; a sliding support mechanism that transmits rotational force of the electric motor to the drive portion and allows the drive portion to slide in the advancing and withdrawing direction with respect to the electric motor; and a piston portion controlled so as to be at a predetermined position in the advancing and withdrawing direction with respect to the housing by means of pressure of a fluid supplied to and discharged from the housing.

10 Claims, 14 Drawing Sheets

(56) References Cited

U.S. PATENT DOCUMENTS

| | | | | |
|---|---|---|---|---|
| 4,044,652 | A * | 8/1977 | Lewis | F15B 9/12 91/368 |
| 4,290,240 | A * | 9/1981 | Robinson | B24B 21/18 451/297 |
| 4,745,815 | A * | 5/1988 | Klopfenstein | B64C 13/38 244/228 |
| 4,807,517 | A * | 2/1989 | Daeschner | F15B 9/12 91/384 |
| 4,905,933 | A * | 3/1990 | Ako | B64C 13/42 244/99.4 |
| 4,932,311 | A * | 6/1990 | Mibu | F15B 15/264 188/161 |
| 5,144,851 | A * | 9/1992 | Grimm | B64C 13/36 74/89.26 |
| 5,214,972 | A | 6/1993 | Larson et al. | |
| 6,352,018 | B1 * | 3/2002 | Krisher | B60T 8/326 92/130 R |
| 6,989,646 | B2 * | 1/2006 | Jackson | F15B 9/12 318/568.1 |
| 7,191,593 | B1 * | 3/2007 | Ho | B64C 13/50 244/78.1 |
| 8,109,163 | B2 * | 2/2012 | Hudson | B64C 13/28 74/89.25 |
| 8,277,205 | B2 * | 10/2012 | Mellet | F15B 1/24 417/415 |
| 8,878,466 | B2 * | 11/2014 | Hausberg | F16H 25/205 310/123 |
| 2005/0056146 | A1 * | 3/2005 | Quenerch'Du | F15B 13/10 92/165 PR |
| 2006/0255207 | A1 * | 11/2006 | Wingett | B64C 13/42 244/99.4 |
| 2007/0018040 | A1 * | 1/2007 | Wingett | B64C 13/42 244/99.4 |
| 2007/0194738 | A1 * | 8/2007 | Hirai | B64C 13/42 318/480 |
| 2012/0032031 | A1 * | 2/2012 | Grohmann | B64C 27/56 244/221 |
| 2012/0304787 | A1 * | 12/2012 | Quenerch'Du | B64C 13/28 74/89.34 |
| 2013/0106215 | A1 * | 5/2013 | Shigetomo | H02K 7/06 310/78 |
| 2013/0340547 | A1 * | 12/2013 | Yasui | F16H 25/20 74/49 |

* cited by examiner

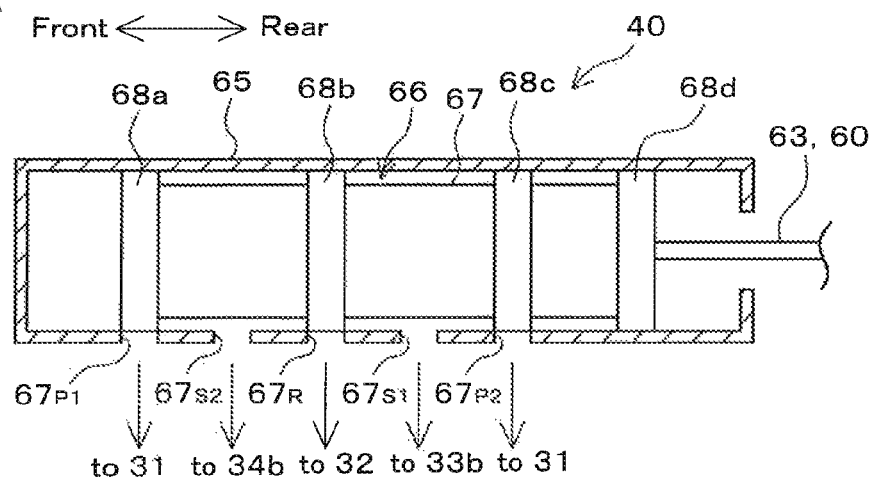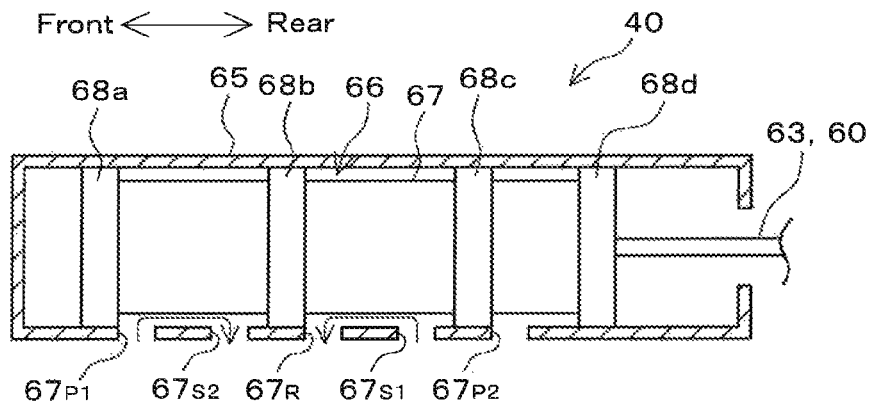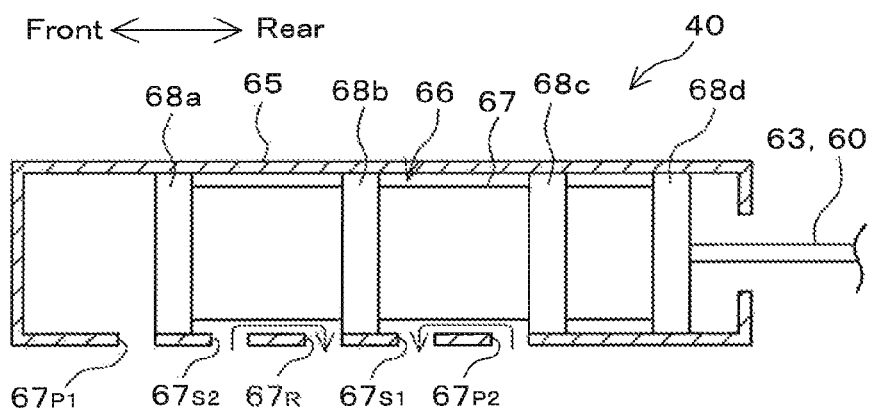

ELECTROMECHANICAL ACTUATOR AND ACTUATOR UNIT

CROSS-REFERENCE TO RELATED APPLICATION

This application is based upon and claims the benefit of priority from Japanese patent application No. 2013-221165, the disclosure of which is herein incorporated by reference in its entirety.

BACKGROUND OF THE INVENTION

1. Field of the Invention

The present invention relates to an electromechanical actuator that has a screw mechanism and outputs linear driving force, and an actuator unit including an electromechanical actuator.

2. Description of Related Art

Conventionally, an electromechanical actuator having an electric motor and a screw mechanism has been used in various fields such as the field of aircraft. This electromechanical actuator converts rotational driving force that is output by the electric motor into linear driving force and outputs the converted driving force, using the screw mechanism. The electromechanical actuator drives various kinds of equipment by an output portion being displaced so as to extend and retract in a linear direction with respect to a housing.

With the aforementioned electromechanical actuator, there are cases where a jammed state occurs in the screw mechanism due to a cause such as prying or seizure. If a jammed state occurs in the electromechanical actuator, it becomes difficult to advance and withdraw the output portion with respect to the housing.

U.S. Pat. No. 5,214,972 discloses an electromechanical actuator provided with a first electromechanical actuator and a second electromechanical actuator. The first electromechanical actuator and the second electromechanical actuator are installed so as to coaxially extend in opposite directions. The first electromechanical actuator and the second electromechanical actuator each include an electric motor and a ball screw mechanism. In the electromechanical actuator having this configuration, even if a jammed state occurs in the screw mechanism in one of the first and second electromechanical actuators, the other one of the first and second electromechanical actuators is in an operable state. For this reason, in this electromechanical actuator, even if the aforementioned jammed state occurs, the output portion can be withdrawn to a position at which the output portion is retracted with respect to the housing.

SUMMARY OF THE INVENTION

However, if the electric motors stop due to occurrence of a jammed state, or a malfunction, a failure in electricity supply, or the like in the electromechanical actuator disclosed in U.S. Pat. No. 5,214,972, the electromechanical actuator will become unable to be driven.

The present invention is for solving the foregoing problem, and an object thereof is to drive an actuator even if a jammed state, a motor stop, or the like occurs.

(1) In order to solve the above-described problem, an electromechanical actuator according to an aspect of the present invention is an electromechanical actuator including: an electric motor attached to a housing; a conversion mechanism portion having a drive portion that is driven to rotate by the electric motor and a driven portion that is driven by the drive portion and advances and withdraws in a predetermined advancing and withdrawing direction, the conversion mechanism portion being accommodated in the housing; a sliding support mechanism that transmits rotational force of the electric motor to the drive portion and allows the drive portion to slide in the advancing and withdrawing direction with respect to the electric motor; and a piston portion provided so as to be rotatable and so as to be unable to be displaced in the advancing and withdrawing direction with respect to the drive portion, the piston portion being controlled so as to be at a predetermined position in the advancing and withdrawing direction with respect to the housing by means of pressure of a fluid supplied to and discharged from the housing.

With this configuration, upon the electric motor being driven, the drive portion also rotates due to the rotational force of the electric motor. Then, the driven portion is advanced and withdrawn in the predetermined advancing and withdrawing direction by the drive portion. The driving force of the electromechanical actuator can be obtained by thus advancing and withdrawing the driven portion.

Note that, at this time, the piston portion is controlled so as to be at the predetermined position with respect to the housing, by the pressure of the fluid supplied to and discharged from the housing being adjusted. With this configuration, the position of the drive portion with respect to the housing is uniquely defined, and accordingly, as an example, the position of the driven portion in the advancing and withdrawing direction is uniquely defined by detecting a rotation angle of the electric motor. The position of the driven portion in the advancing and withdrawing direction can thereby be controlled by controlling the rotation angle of the electric motor, for example.

As mentioned above, upon the drive portion being driven to rotate by the electric motor in a state where the piston portion is controlled so as to be at the predetermined position in the housing, the driven portion advances and withdraws in the advancing and withdrawing direction. Since the driven portion can thereby be moved to a desired position with respect to the housing, various kinds of equipment connected to the driven portion can be driven so as to be at a desired position or in a desired state.

Furthermore, with this configuration, even if a jammed state occurs in the conversion mechanism portion and the driven portion becomes unable to be advanced and withdrawn by the drive portion, the drive portion and the driven portion that are in a state of being integrated with each other can be advanced and withdrawn with respect to the housing by means of the pressure of the fluid.

Specifically, if a jammed state occurs in the conversion mechanism portion, the piston portion, which can slide in the advancing and withdrawing direction with respect to the electric motor by means of the sliding support mechanism, can be moved in the advancing and withdrawing direction by adjusting the pressure of the fluid supplied to the housing. Then, the drive portion and the driven portion that are in a state of being integrated with each other also advance and withdraw in the advancing and withdrawing direction together with the piston portion. The output of the electromechanical actuator can thereby be obtained.

Accordingly, with this configuration, an electromechanical actuator can be provided in which the driven portion can be advanced and withdrawn with respect to the housing even if a jammed state occurs in the conversion mechanism portion. Moreover, this advancing and withdrawing operation is performed by using the pressure of the fluid as a power source, as mentioned above. Accordingly, even in a case where, for example, the electric motor ceases to be driven for some reason, the aforementioned advancing and withdrawing operation is performed. Note that, as an example, the following method can be employed in order to control the position of the driven portion in the advancing and withdrawing direction when operating the driven portion by means of the fluid pressure. Specifically, a linear sensor that detects the position (the front-rear position) of the piston portion in the advancing and withdrawing direction with respect to the housing (or with respect to the output shaft of the electric motor fixed with respect to the housing) may be provided, and the supply and discharge of the fluid to/from the housing may be controlled based on the front-rear position of the piston portion detected by the linear sensor.

Accordingly, with this configuration, the actuator can be driven by using both electric power and the fluid pressure as driving sources. That is to say, with this configuration, the actuator can be driven even if a jammed state, a motor stop, or the like occurs.

(2) Preferably, a driven portion-side pressure chamber that is a space on a driven portion advancing direction side relative to the driven portion and to and from which the fluid is supplied and discharged, and an intermediate pressure chamber that is a space between the driven portion and the piston portion are formed in the housing, and a communication path that brings the driven portion-side pressure chamber and the intermediate pressure chamber into communication with each other is formed in the driven portion.

With this configuration, when the fluid accummulated in the driven portion-side pressure chamber is discharged to the outside of the driven portion-side pressure chamber in order to move the driven portion in the advancing direction, this fluid can be discharged not only to the outside of the housing but also to the intermediate pressure chamber via the communication path. For example, in the case where the aforementioned communication path is not formed, the fluid accummurated in the driven portion-side pressure chamber when the driven portion is moved in the advancing direction by the electric motor becomes a load, which hinders the advance of the driven portion. In contrast, as a result providing the communication path as mentioned above, the fluid accummulated in the driven portion-side pressure chamber flows into the intermediate pressure chamber via the communication path, and accordingly the driven portion can be smoothly advanced in the advancing direction.

(3) Preferably, an intermediate pressure chamber that is a space between the driven portion and the piston portion, and a drive portion-side pressure chamber that is a space on a driven portion withdrawing direction side relative to the driven portion and to and from which the fluid is supplied and discharged are formed in the housing, and the drive portion has: a tubular portion formed in a tubular shape extending in the advancing and withdrawing direction, an inner space of the tubular portion being in communication with the drive portion-side pressure chamber through a gap formed between an inner circumferential face side of the tubular portion and a rotary shaft of the electric motor, and the inner space being in communication with the intermediate pressure chamber through a gap formed between an outer circumferential face side of the tubular portion and the driven portion; and a partitioning wall provided inside of the tubular portion so as to partition the inner space into a space on the drive portion-side pressure chamber side and a space on the intermediate pressure chamber side.

With this configuration, since the drive portion is formed so as to be hollow, the weight of the drive portion can be reduced. However, if the drive portion is simply formed in a tubular shape in this manner, the drive portion-side pressure chamber and the intermediate pressure chamber will be in communication with each other. In contrast, with this configuration, the partitioning wall having a wall shape that partitions the inner space of the tubular portion into a space on the drive portion-side pressure chamber side and a space on the intermediate pressure chamber side is provided within the tubular portion. It is thereby possible to prevent the drive portion-side pressure chamber and the intermediate pressure chamber from being in communication with each other, while suppressing an increase in the weight of the drive portion.

(4) Preferably, the conversion mechanism portion has: an input screw provided as the drive portion; an output screw provided as the driven portion and capable of advancing and withdrawing in the advancing and withdrawing direction with respect to the input screw; and a plurality of balls provided between a screw channel formed in the input screw and a screw channel formed in the output screw.

With this configuration, it is possible to provide, with a relatively simple configuration, an electromechanical actuator that can be driven even if a jammed state occurs in the conversion mechanism portion or electric power ceases to be supplied to the electric motor.

(5) Preferably, the sliding support mechanism is a ball spline mechanism.

With this configuration, the drive portion can be smoothly moved in a sliding manner in the advancing and withdrawing direction with respect to the electric motor, by means of the ball spline mechanism.

(6) In order to solve the above-described problem, an actuator unit according to an aspect of this invention includes: any of the above-described electromechanical actuators; a spool portion that advances and withdraws in the advancing and withdrawing direction of the driven portion of the electromechanical actuator so as to switch a moving direction of the driven portion; and a connection mechanism that connects the piston portion of the electromechanical actuator and the spool portion to each other.

With this configuration, even if a jammed state occurs in the conversion mechanism portion or a malfunction occurs in the supply and discharge of the fluid to/from the housing, the piston portion and the conversion mechanism portion can be advanced and withdrawn together with the spool portion by advancing and withdrawing the spool portion. That is to say, with this configuration, an actuator unit having excellent redundancy can be provided.

(7) More preferably, the connection mechanism has: a first link member provided such that a first end side thereof is connected to the piston portion and extends in a direction in which the piston portion advances and withdraws; a second link member provided such that a first end side thereof is pivotably connected to a second end side of the first link member and extends in a direction of intersecting the first link member; and a third link portion provided such that a first end side thereof is fixed to the spool portion and extends in a direction in which the first link member extends, and a second end side thereof is pivotably connected to an intermediate portion of the second link member in a direction in which the second link member extends, and the actuator unit further includes a link end lock mechanism capable of switching the link mechanism between a locked state where a second end portion of the second link member is fixed and an unlocked state where fixation of the second end portion is canceled.

With this configuration, when the connection mechanism is in the locked state where the second end portion of the second link member is fixed, the displacement of the piston portion in the advancing and withdrawing direction can be mechanically transmitted to the spool portion via the connection mechanism. Accordingly, even if a fluid circuit fails in a state where the driven portion is displaced by the electric motor, the piston portion can be retained at the predetermined position in the housing.

Furthermore, with this configuration, a displacement of one of the spool portion and the piston portion can be prevented from being mechanically transmitted to the other via the link mechanism, by canceling fixation of the second end portion of the second link member and bringing the link mechanism into the unlocked state.

Specifically, in the case where, for example, the output portion is advanced and withdrawn by means of the pressure of the fluid in this configuration, fixation of the second end portion of the second link member is canceled by the link mechanism being switched to the unlocked state by the link end lock mechanism.

In the above-described unlocked state, even if the piston portion is displaced in the advancing and withdrawing direction, the second link member pivots around a portion of the second link member serving as a fulcrum, the portion being pivotably connected to the third link member. That is to say, in the unlocked state, the displacement of the piston portion in the advancing and withdrawing direction is not mechanically fed back to the spool portion of a first switching portion via the link mechanism.

On the other hand, in the above-described unlocked state, even if the spool portion is displaced in the advancing and withdrawing direction, the second link member pivots around a portion of the second link member serving as a fulcrum, the portion being pivotably connected to the first link member. That is to say, in the unlocked state, the displacement of the spool portion of the first switching portion in the advancing and withdrawing direction is not mechanically fed back to the cylinder portion via the link mechanism.

Accordingly, with this configuration, a configuration can be provided that enables appropriate switching between a state where a displacement of the piston portion is fed back to the spool portion and a state where a displacement of one of the piston portion and the spool portion is not fed back to the other. That is to say, with this configuration, it is possible to appropriately operate an actuator unit that operates in respective operation modes (specifically, a mode of advancing and withdrawing the piston portion by means of the pressure of the fluid supplied to and discharged from the housing, and a mode of advancing and withdrawing the piston portion by advancing and withdrawing the spool portion).

(8) More preferably, the link end lock mechanism has a cylinder having a tubular shape and a pair of pistons each being capable of sliding in a cylinder axis direction of the cylinder, the link end lock mechanism being configured such that the link mechanism enters the locked state as a result of the pair of pistons sandwiching and holding the second end portion of the second link member, and such that the link mechanism enters the unlocked state as a result of the pair of pistons moving away from each other.

With this configuration, the link mechanism can be brought into the locked state by sandwiching and holding the second end portion of the second link member, using the pair of pistons. On the other hand, since the second end portion of the second link member is not sandwiched and held by the pair of pistons as a result of the pair of pistons moving away from each other, the link mechanism can be brought into the unlocked state. Accordingly, with this configuration, a specific configuration can be provided that enables switching between the locked state and the unlocked state of the link mechanism. Moreover, with this configuration, since it is possible to switch between the locked state and the unlocked state by merely causing the pair of pistons to approach each other or move away from each other, an actuator unit that can be easily applied to the aforementioned respective operation modes can be provided.

Note that the above and other objects, features, and advantages of the present invention will become apparent by reading the following description with the attached drawings.

BRIEF DESCRIPTION OF THE DRAWINGS

FIG. 9A is a vertical cross-sectional diagram schematically showing a configuration of a drive control valve, and shows the drive control valve in a state of being located at a neutral position.

FIG. 9B is a vertical cross-sectional diagram schematically showing a configuration of the drive control valve, and shows the drive control valve in a state of being located at a second position.

FIG. 9C is a vertical cross-sectional diagram schematically showing a configuration of the drive control valve, and shows the drive control valve in a state of being located at a first position.

DETAILED DESCRIPTION OF THE INVENTION

Hereinafter, a mode for carrying out the present invention will be described with reference to the drawings. In the following embodiment, an exemplary mode will be described in which an actuator unit is provided in a moving surface drive mechanism for driving a moving surface of an aircraft. However, the present invention is not limited to the exemplary mode described in the following embodiment, and is widely applicable. Specifically, the present invention is widely applicable to an actuator unit having a conversion mechanism portion capable of converting rotational driving force into linear motion.

Figure 1:
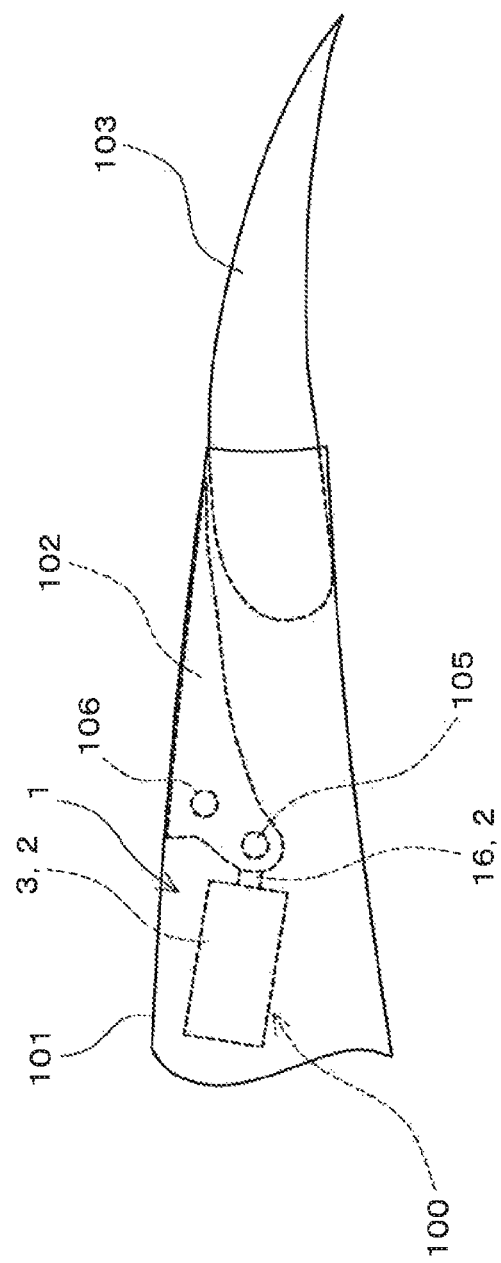
FIG. 1 is a schematic view showing a state where an electromechanical actuator in an actuator unit according to an embodiment of the present invention is attached to a wing and a moving surface of an aircraft.

FIG. 1 is a schematic view showing an exemplary state where an actuator unit 1 according to an embodiment of the present invention is attached to a wing 101 and a moving surface 102 of an aircraft. The actuator unit 1 includes an electromechanical actuator 2 and a hydraulic circuit 30 (fluid circuit). Note that a hydraulic circuit 30 is omitted in FIGS. 1 and 2. FIG. 1 omits the main part of the aircraft. FIG. 1 schematically shows a part of the wing 101, the moving surface 102, and a moving surface 103. In the present embodiment, the wing 101 is configured as a main wing of the aircraft. The moving surface 102 is configured as a spoiler. In the present embodiment, the moving surface 102 is configured as equipment driven by the electromechanical actuator 2. The moving surface 103 is configured as a flap Note that FIG. 1 schematically shows a state where a rear-end portion of the wing 101 is seen in the left-right direction of the aircraft. FIG. 1 also schematically shows only outlines of the wing 101 and the moving surfaces 102 and 103.

Moving Surface Drive Mechanism

Prior to the description of the actuator unit 1, an aircraft moving surface drive mechanism 100, which is an example to which the actuator unit 1 is applied, will be described first. The moving surface drive mechanism 100 shown in FIG. 1 is installed in the wing 101 of the aircraft. The moving surface drive mechanism 100 is used for driving the moving surface 102 of the aircraft. The moving surface drive mechanism 100 is configured to include the actuator unit 1, a rotary shaft (not shown), and a pivot shaft 105.

The rotary shaft is installed in the wing 101. An end portion of a housing 3 of the electromechanical actuator 2 is rotatably connected to the rotary shaft. The electromechanical actuator 2 is thereby supported so as to be able to pivot around the rotary shaft with respect to the wing 101.

The pivot shaft 105 is installed in the moving surface 102. An end portion of an output portion 16 of the electromechanical actuator 2 is rotatably connected to the moving surface 102. Note that the moving surface 102 is rotatably supported with respect to a fulcrum shaft 106. The fulcrum shaft 106 is installed in the wing 101. The moving surface 102 is thereby supported so as to be able to pivot around the fulcrum shaft 106 with respect to the wing 101.

In the actuator unit 1, the output portion 16 is provided so as to be able to project (advance) and to be relatively displaced with respect to the housing 3. That is to say, the output portion 16 is configured so as to be capable of an operation of advancing from the housing 3 and thereby extending from the housing 3. Furthermore, the output portion 16 is also configured to be capable of an operation of retracting (withdrawing) with respect to the housing 3.

Figure 2:
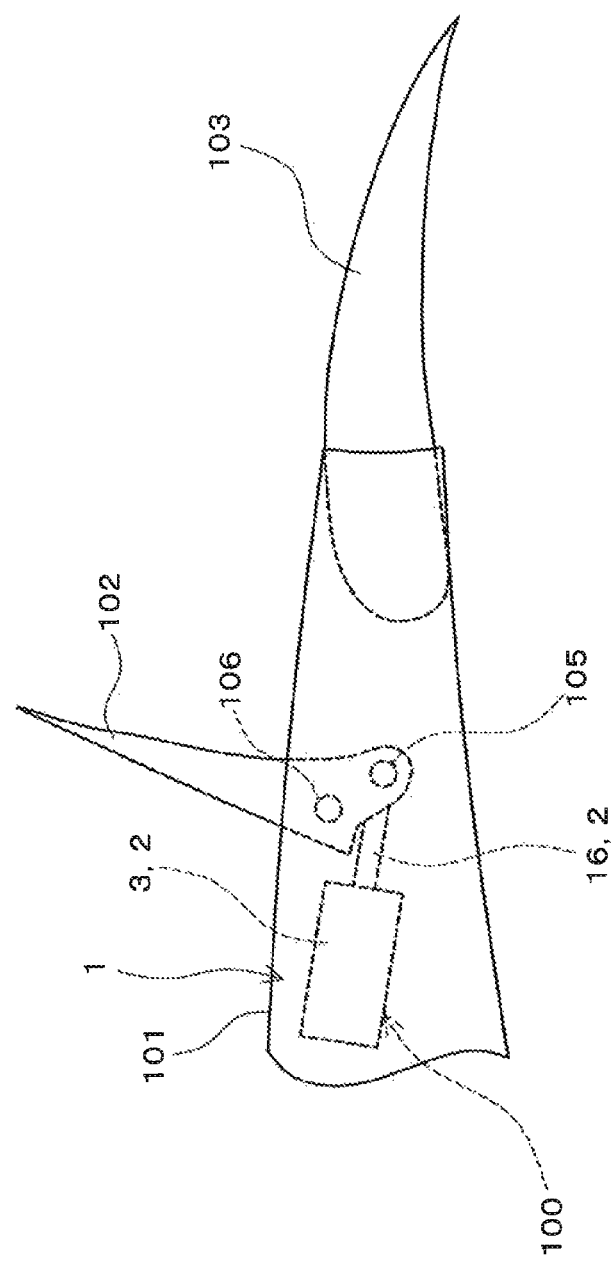
FIG. 2 is a schematic view showing a state where the moving surface is driven from the state shown in FIG. 1 by the electromechanical actuator.

FIG. 2 is a schematic view showing a state where the moving surface 102 is driven from the state shown in FIG. 1 by the actuator unit 1 in the moving surface drive mechanism 100. FIG. 1 shows a state where the output portion 16 has withdrawn to the position where the output portion 16 is fully retracted with respect to the housing 3. On the other hand, FIG. 2 shows a state where the output portion 16 projects and extends from the housing 3. As shown in FIGS. 1 and 2, the moving surface 102 is driven due to the actuator unit 1 operating. The moving surface 102 is driven so as to pivot around the fulcrum shaft 106 with respect to the wing 101.

Note that the moving surface drive mechanism 100 shown in FIG. 1 may further be provided with a reaction link. The reaction link is provided as a member that, when the output from the actuator unit 1 is given to the moving surface 102, supports the reaction force from the moving surface 102 generated by this output. One end portion of the reaction link is connected to the rotary shaft, and the other end portion is connected to the fulcrum shaft 106. As a result of provision of the reaction link, the influence of a load received by the moving surface 102, which is movable, being directly exerted on the wing 101, which is fixed, is suppressed.

Overall Configuration of Actuator Unit

Figure 3:
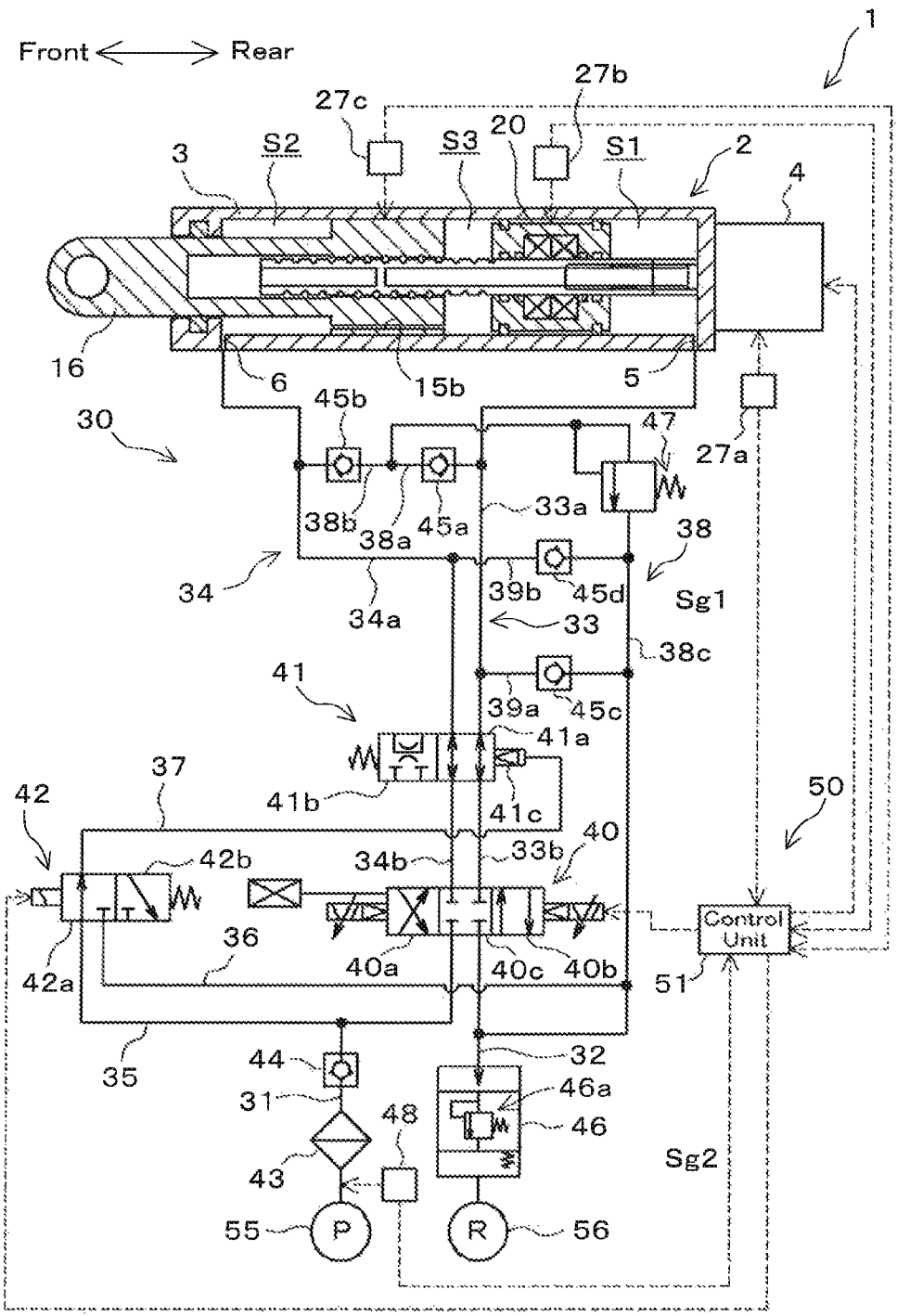
FIG. 3 is a diagram schematically showing a configuration of the actuator unit according to an embodiment of the present invention, and shows an exemplary state of the actuator unit in an electric mode or a hydraulic mode.

FIG. 3 is a diagram schematically showing the actuator unit 1. As shown in FIG. 3, the actuator unit 1 includes the electromechanical actuator 2 and the hydraulic circuit 30. The actuator unit 1 is configured so as to be able to be driven by both the rotational force of an electric motor 4 in the electromechanical actuator 2 and the pressure of pressure oil serving as a fluid that flows in the hydraulic circuit 30. That is to say, the actuator unit 1 can be driven by both electric power and oil pressure.

Configuration of Electromechanical Actuator

Figure 4:
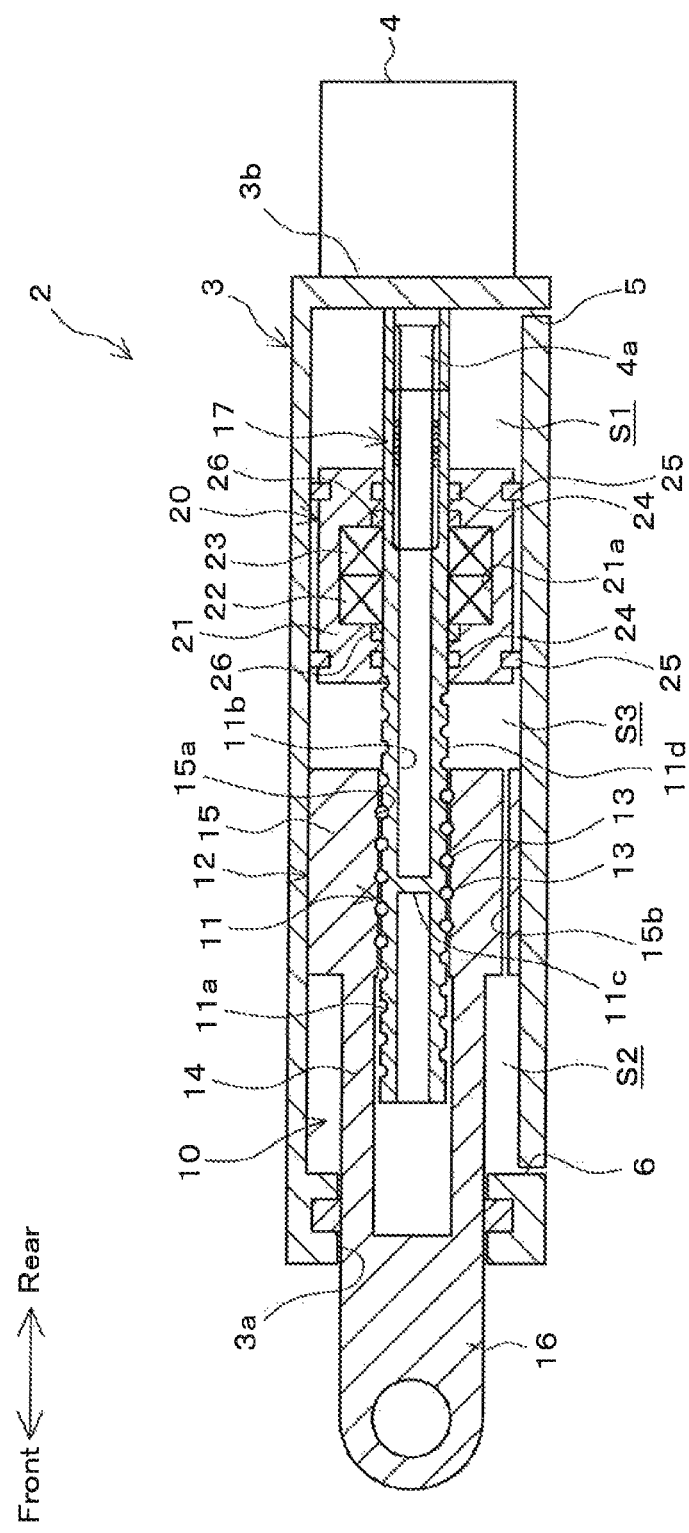
FIG. 4 is a cross-sectional diagram schematically showing a configuration of the electromechanical actuator in the actuator unit shown in FIG. 3.

FIG. 4 is a cross-sectional diagram schematically showing a configuration of the electromechanical actuator 2. As shown in FIG. 4, the electromechanical actuator 2 is configured to include the housing 3, a screw mechanism 10 (a conversion mechanism portion), the electric motor 4, a piston portion 20, and the like. Note that, in the following diagrams, the direction indicated by the arrow denoted as "front" will be referred to as the front side or frontward, and the direction indicated by the arrow denoted as "rear" will be referred to as the rear side or rearward, for the sake of convenience of the description.

The housing 3 is provided as a member having a cylindrical shape extending in the front-rear direction. An opening portion 3a is formed on the first end side (front side in FIG. 4) of the housing 3, and a bottom portion 3b is formed on the second end side (rear side in FIG. 4) of the housing 3. The housing 3 accommodates the screw mechanism 10, an output shaft 4a of the electric motor 4, the piston portion 20, and the like.

A first port 5 and a second port 6 are formed in the housing 3. These ports 5 and 6 are for allowing the pressure oil flowing in the hydraulic circuit 30, the details of which will be described later, to flow into and out of the housing 3. The first port 5 is constituted by a through hole formed on the second end side (rear side in FIG. 4) of a cylindrical wall portion of the housing 3. The second port 6 is constituted by a through hole formed on the first end side (front side in FIG. 4) of the cylindrical wall portion of the housing 3.

The screw mechanism 10 is provided as a conversion mechanism portion that converts rotational driving force which is output by the electric motor 4 into linear driving force and outputs the converted driving force. As shown in FIG. 4, the screw mechanism 10 is configured to include a first screw 11 (drive portion), a second screw 12 (driven portion), a plurality of balls 13, and the like.

The first screw 11 is provided as a shaft-like member extending in the axial direction of the housing 3, and is accommodated in the housing 3. In the present embodiment, the first screw 11 is provided as an input screw provided on the electric motor 4 side. A helical screw channel 11a is formed in a front portion of the outer circumferential face of the first screw 11. Also, a through hole 11b that passes through an axial portion of the first screw 11 in the axial direction is formed in the first screw 11. The first screw 11 thereby includes a tubular portion 11d formed in a tubular shape. The first screw 11 is rotatably supported with respect to the housing 3 by a pair of bearings 22 and 23 via the piston portion 20, the details of which will be described later. The first screw 11 also has a partitioning wall 11c formed in a portion within the tubular portion 11d between a front portion and a rear portion of the through hole 11b. This partitioning wall 11c is for preventing a first pressure chamber S1 and a third pressure chamber S3, the details of which will be described later, from being in communication with each other.

A part of the second screw 12, or more specifically, a rear portion of the second screw 12 is accommodated in a front portion of the housing 3. In the present embodiment, the second screw 12 is provided as an output screw provided on the output portion 16 side. The second screw 12 has a first tube portion 14 and a second tube portion 15 that are approximately cylindrical portions within which the first screw 11 is installed, and a projecting portion 16. These parts are integrally formed.

The first tube portion 14 is provided as an intermediate portion of the second screw 12 in the axial direction, and is arranged concentrically with the housing 3. A ring-shaped space is formed between the outer circumferential face of the first tube portion 14 and the inner circumferential face of the housing 3. This ring-shaped space is provided as a second pressure chamber S2.

The second tube portion 15 is provided as a rear end portion of the second screw 12 in the axial direction, and is arranged concentrically with the housing 3. That is to say, the first tube portion 14 and the second tube portion 15 are concentric with each other. The inside diameter of the second tube portion 15 is approximately the same as the inside diameter of the first tube portion 14, whereas the outside diameter of the second tube portion 15 is slightly smaller than the inside diameter of the housing 3. The second tube portion 15 is thereby in a state of being able to slide in the axial direction within the housing 3.

A helical screw channel 15a is formed in the inner circumferential face of the second tube portion 15. A through hole that passes through the second tube portion 15 in the front-rear direction (a direction parallel with the axial direction of the second tube portion 15) is formed in a radially outside portion of the second tube portion 15. This through hole is provided as a communication path 15b that brings the second pressure chamber S2 and the third pressure chamber S3, which is a space located rearward of the second screw 12 and frontward of the piston portion 20 within the housing 3, into communication with each other.

The projecting portion 16 is provided as a front end portion of the second screw 12 in the axial direction, projects frontward from the front end of the first tube portion 14, and is exposed to the outside via the opening portion 3a of the housing 3. The projecting portion 16 is provided as an output portion 16 that outputs the driving force generated by the electromechanical actuator 2 to the outside. As mentioned above, this output portion 16 is connected to the moving surface 102 via the pivot shaft 105. Rotation of the output portion 16, i.e., of the second screw 12 with respect to the housing 3 is thereby restricted.

The plurality of balls 13 are configured to circulate between the screw channel 15a of the second screw 12 and the screw channel 11a of the first screw 11. That is to say, the screw mechanism 10 is configured as a ball screw mechanism.

The electric motor 4 is used as a driving source for driving the moving surface 102, which is equipment having a relatively large weight. Accordingly, a motor having a relatively high rated voltage (e.g., a motor having a rated voltage of 270 V) is used as the electric motor 4. Also, the electric motor 4 is an electric motor having a brake (not shown). This brake is for preventing the electric motor 4 from rotating when the actuator unit 1 is operated by the oil pressure.

The electric motor 4 is fixed to a rear end portion of the housing 3. Specifically, the electric motor 4 is fixed to a bottom portion 3b of the housing 3, in a state where the output shaft 4a of the electric motor 4 is inserted into the through hole 11b of the first screw 11. The output shaft 4a of the electric motor 4 and the first screw 11 are connected to each other by a ball spline mechanism 17. This ball spline mechanism 17 is provided as a sliding support mechanism that transmits the rotational force of the electric motor 4 to the first screw 11 and allows the first screw 11 to slide in the axial direction with respect to the electric motor 4. Note that the output shaft 4a of the electric motor 4 and the first screw 11 may be connected to each other by spline coupling.

In the screw mechanism 10, upon the electric motor 4 being driven, the rotational force of the output shaft 4a of the electric motor 4 is transmitted to the first screw 11. The plurality of balls 13 thereby roll between the screw channel 11a of the first screw 11 and the screw channel 15a of the second screw 12. The second screw 12 is thereby displaced in the axial direction of the first screw 11.

The piston portion 20 is arranged rearward of the second screw 12 within the housing 3. The piston portion 20 has a piston body 21 and the pair of bearings 22 and 23.

The piston body 21 is a member formed in an approximately cylindrical shape. The outside diameter of the piston body 21 is slightly smaller than the inside diameter of the housing 3. Meanwhile, the inside diameter of the piston body 21 is slightly larger than the outside diameter of the first screw 11. The first screw 11 is fixed to the piston body 21 in a state where the first screw 11 is inserted into the piston body 21 via O-rings 24 and 24 provided at both end portions in the axial direction on the inner circumferential side of the piston body 21. The piston body 21 is in a state of being able to slide in the axial direction with respect to the inner circumference of the housing 3 via O-rings 25 and 25 provided at both end portions in the axial direction on the outer circumferential side of the piston body 21. A loop-shaped recess portion having a loop shape that recedes radially outward is formed in the center portion in the axial direction on the inner circumferential side of the piston body 21.

The pair of bearings 22 and 23 are fixed in the axial direction of the first screw 11 by being sandwiched and held by a pair of retaining rings 26 and 26, in a state of being adjacent to each other in the axial direction of the first screw 11, within the loop-shaped recess portion 21*a* of the aforementioned piston body 21. An inner ring (not shown) of each of the bearings 22 and 23 is fixed to the first screw 11, and an outer ring (not shown) thereof is fixed to the loop-shaped recess portion 21*a* of the piston body 21.

With the above-described configuration, the piston portion 20 rotatably holds the first screw 11 with respect to the housing 3, and restricts a displacement of the first screw 11 in the axial direction with respect to the piston portion 20.

The three pressure chambers, or specifically, the first pressure chamber S1 (drive portion-side pressure chamber), the second pressure chamber S2 (driven portion-side pressure chamber), and the third pressure chamber S3 (intermediate pressure chamber) are formed in the housing 3. The first pressure chamber S1 is a space formed rearward of the piston portion 20. The second pressure chamber S2 is a loop-shaped space formed further on the output portion 16 side than the second tube portion 15 of the second screw 12, as mentioned above. The third pressure chamber S3 is a space formed rearward of the second tube portion 15 and frontward of the piston portion 20, as mentioned above. The first pressure chamber S1 is in communication with the hydraulic circuit 30 via the first port 5, and the second pressure chamber S2 is in communication with the hydraulic circuit 30 via the second port 6.

The electromechanical actuator 2 also has a jammed state detection sensor 27*a*, a first linear sensor 27*b*, and a second linear sensor 27*c* (see FIG. 3).

The jammed state detection sensor 27*a* is a sensor for detecting a jammed state of the screw mechanism 10. As an example, the jammed state detection sensor 27*a* detects a jammed state of the screw mechanism 10, based on the value of current that flows through the electric motor 4. The jammed state detection sensor 27*a*, upon detecting a jammed state of the screw mechanism 10, transmits a notification signal Sg1 to a later-described control unit 51.

The first linear sensor 27*b* is configured to detect a front-rear position of the piston portion 20 relative to the output shaft 4*a* of the electric motor 4 that is fixed with respect to the housing 3. That is to say, the first linear sensor 27*a* is a sensor for detecting the front-rear position of the piston portion 20 relative to the housing 3. The front-rear position of the piston portion 20 is transmitted to the control unit 51. The second linear sensor 27*c* is a sensor for detecting a front-rear position of the output portion 16 relative to the first screw 11. The front-rear position of the output portion 16 is transmitted to the control unit 51.

Note that FIG. 3 and other diagrams schematically show the respective positions of the first linear sensor 27*b* and the second linear sensor 27*c*. As an example, the first linear sensor 27*b* and the second linear sensor 27*c* are each constituted by an LVDT (linear variable-differential transformer), and are arranged within the through hole 11*b* formed in the first screw 11.

Configuration of Hydraulic Circuit

The hydraulic circuit 30 is provided as a fluid circuit for supplying and discharging the pressure oil to/from the pressure chambers S1, S2, and S3 in the electromechanical actuator 2. As shown in FIG. 3, the hydraulic circuit 30 includes a hydraulic pump 55, a reservoir tank 56, a plurality of oil passages, and a plurality of valves, and is configured as a result of these parts being connected to one another. The hydraulic circuit 30 has, as the plurality of oil passages, an oil supply passage 31 (a fluid supply passage), an oil discharge passage 32, a first oil passage 33 (a first passage), a second oil passage 34 (a second passage), a pilot pressure oil supply passage 35, a pilot pressure oil discharge passage 36, a pilot pressure oil passage 37, a relief passage 38, and the like. The hydraulic circuit 30 also has, as the plurality of valves, a drive control valve 40 (a first switching valve), a mode switching valve 41 (a second switching valve), an electromagnetic valve 42, a relief valve 47, and the like.

The hydraulic pump 55 is for conveying the pressure oil within the hydraulic circuit 30. The oil supply passage 31 is connected to the discharge side of the hydraulic pump 55.

The oil supply passage 31 is an oil passage for supplying the pressure oil discharged from the hydraulic pump 55 to the electromechanical actuator 2 side. A first end side of the oil supply passage 31 is connected to the discharge side of the hydraulic pump 55, and a second end side thereof is connected to the drive control valve 40. The oil supply passage 31 is provided with a filter 43 and a check valve 44 in this order from the upstream side toward the downstream side. Foreign objects in the pressure oil discharged from the hydraulic pump 55 are removed by the filter 43, and the pressure oil is thereafter conveyed toward the electromechanical actuator 2 via the check valve 44. The check valve 44 prevents the pressure oil from flowing backward from the electromechanical actuator 2 side toward the discharge side of the hydraulic pump 55.

The oil supply passage 31 is also provided with a pressure sensor 48 for measuring the pressure of the pressure oil in the oil supply passage 31. If the pressure of the pressure oil sent in a pressurized manner from the hydraulic pump 55 is smaller than or equal to a predetermined value, the pressure sensor 48 transmits a notification signal Sg2 to the later-described control unit 51.

The reservoir tank 56 is for accummulating the pressure oil conveyed from the electromechanical actuator 2 side. The oil discharge passage 32 is connected to the reservoir tank 56.

The oil discharge passage 32 is an oil passage for conveying the pressure oil from the electromechanical actuator 2 side into the reservoir tank 56. A first end side of the oil discharge passage 32 is connected to the reservoir tank 56, and a second end side thereof is connected to the drive control valve 40. The oil discharge passage 32 is provided with an accumulator 46 having a relief valve 46*a*. As a result of the accumulator 46 being provided in the oil discharge passage 32, the pressure of the pressure oil in the hydraulic circuit 30 on the upstream side of the accumulator 46 (i.e., the side opposite to the reservoir tank 56) and in the electromechanical actuator 2 is maintained at or below relief pressure of the relief valve 46*a* in the accumulator relief valve 46*a*.

The first oil passage 33 is an oil passage for selectively connecting the first port 5 to one of the hydraulic pump 55 and the reservoir tank 56. The first oil passage 33 has a first port-side oil passage 33*a* (a first port-side passage) and a drive control valve-side first oil passage 33*b* (a switching valve-side first passage).

A first end side of the first port-side oil passage 33*a* is connected to the first port 5, and a second end side thereof is connected to the mode switching valve 41. A first end side of the drive control valve-side first oil passage 33*b* is connected to the mode switching valve 41, and a second end side thereof is connected to the drive control valve 40.

The second oil passage 34 is an oil passage for selectively connecting the second port 6 to the other one of the hydraulic pump 55 and the reservoir tank 56. The second oil passage 34 has a second port-side oil passage 34a (a second port-side passage) and a drive control valve-side second oil passage 34b (a switching valve-side second passage).

A first end side of the second port-side oil passage 34a is connected to the second port 6, and a second end side thereof is connected to the mode switching valve 41. A first end side of the drive control valve-side second oil passage 34b is connected to the mode switching valve 41, and a second end side thereof is connected to the drive control valve 40.

The drive control valve 40 is for advancing and withdrawing the output portion 16 of the electromechanical actuator 2 with respect to the housing 3, by controlling the oil supply and discharge to/from the first pressure chamber S1 and the second pressure chamber S2.

End portions of the four oil passages (the oil supply passage 31, the oil discharge passage 32, the first oil passage 33, and the second oil passage 34) are connected to the drive control valve 40. The drive control valve 40 is provided as a switching valve that switches connection status of these four oil passages bewteen three states. Specifically, the drive control valve 40 is configured to be able to be switched to a first position 40a for bringing the oil supply passage 31 into communication with the first oil passage 33 and bringing the oil discharge passage 32 into communication with the second oil passage 34, a second position 40b for bringing the oil supply passage 31 into communication with the second oil passage 34 and bringing the oil discharge passage 32 into communication with the first oil passage 33, and a neutral position 40c for blocking these four oil passages 31, 32, 33 and 34.

In the present embodiment, the drive control valve 40 is provided as an electrohydraulic servo valve (EHSV), and is configured to control the operations of the actuator as a result of the position of a spool being controlled by pilot pressure oil introduced to both ends of the spool. Note that, as an example, the electrohydraulic servo valve is configured to include a pilot stage and a main stage. At the pilot stage, a nozzle-flapper hydraulic pressure amplification mechanism is driven based on an electric signal from the control unit 51, the details of which will be described later, and the pressure of pilot pressure oil introduced to both ends of the spool at the main stage is controlled. Then, the position of the spool at the main stage is controlled by the pilot pressure oil generated at the pilot stage, and the drive control valve 40 is thereby switched to any of the first position 40a, the second position 40b, and the neutral position 40c. As a result, the supply of the pressure oil to the electromechanical actuator 2 and the discharge of the pressure oil from the electromechanical actuator 2 are controlled.

The mode switching valve 41 is a switching valve for switching the hydraulic circuit 30 between a supply/discharge mode and a bypass mode. The supply/discharge mode is a mode for bringing the hydraulic circuit 30 into a state of being able to supply and discharge the pressure oil to/from the first pressure chamber S1 and the second pressure chamber, and the bypass mode is a mode for bringing the first port-side oil passage 33a and the second port-side oil passage 34a into communication with each other.

As shown in FIG. 3, the mode switching valve 41 is provided so as to span between the first oil passage 33 and the second oil passage 34. Four oil passages, namely the first port-side oil passage 33a, the second port-side oil passage 34a, the drive control valve-side first oil passage 33b, and the drive control valve-side second oil passage 34b are connected to the mode switching valve 41.

The mode switching valve 41 is configured to be able to be switched between a supply/discharge position 41a and a bypass position 41b. The supply/discharge position 41a is a position for bringing the first port-side oil passage 33a and the drive control valve-side first oil passage 33b into communication with each other, and also bringing the second port-side oil passage 34a and the drive control valve-side second oil passage 34b into communication with each other. The bypass position 41b is a position for bringing the first port-side oil passage 33a and the second port-side oil passage 34a into communication with each other, and blocking the drive control valve-side first oil passage 33b and the drive control valve-side second oil passage 34b.

The mode switching valve 41 is located at the supply/discharge position 41a in a state where the pressure oil is supplied to a pilot pressure chamber 41c of the mode switching valve 41 via the pilot pressure oil passage 37, the details of which will be described later. On the other hand, the mode switching valve 41 is located at the bypass position 41b in a state where the pressure oil is discharged from the pilot pressure chamber 41c.

The pilot pressure oil supply passage 35 is an oil passage for supplying the pressure oil to the pilot pressure chamber 41c of the mode switching valve 41. A first end side of the pilot pressure oil supply passage 35 is connected to the downstream side of the check valve 4-4 in the oil supply passage 31, and a second end side thereof is connected to the electromagnetic valve 42.

The pilot pressure oil discharge passage 36 is an oil passage for discharging the pressure oil from the pilot pressure chamber 41c of the mode switching valve 41. A first end side of the pilot pressure oil discharge passage 36 is connected to the upstream side of the accumulator 46 in the oil discharge passage 32, and a second end side thereof is connected to the electromagnetic valve 42.

The pilot pressure oil passage 37 is an oil passage for supplying or discharging the pressure oil to/from the pilot pressure chamber 41c of the mode switching valve 41. A first end side of the pilot pressure oil passage 37 is connected to the pilot pressure chamber 41c, and a second end side thereof is connected to the electromagnetic valve 42.

The electromagnetic valve 42 is a switching valve for switching between the supply and discharge of the pressure oil to/from the pilot pressure chamber 41c. As mentioned above, three oil passages, namely the pilot pressure oil supply passage 35, the pilot pressure oil discharge passage 36, and the pilot pressure oil passage 37 are connected to the electromagnetic valve 42.

The electromagnetic valve 42 is configured to be able to be switched between an oil supply position 42a and an oil discharge position 42b. The oil supply position 42a is a position for bringing the pilot pressure oil supply passage 35 and the pilot pressure oil passage 37 into communication with each other, and blocking the pilot pressure oil discharge passage 36. The oil discharge position 42b is a position for bringing the pilot pressure oil discharge passage 36 and the pilot pressure oil passage 37 into communication with each other, and blocking the pilot pressure oil supply passage 35.

The electromagnetic valve 42 is switched between the oil supply position 42a and the oil discharge position 42b as a result of being excited and demagnetized based on an electric signal from the control unit 51, the details of which will be described later. Specifically, the electromagnetic valve 42 in an excited state is switched to the oil supply position 42a as shown in FIG. 3. On the other hand, the electromagnetic valve 42 in a demagnetized state is switched to the oil discharge position 42b.

The relief passage 38 is for releasing the pressure of the first oil passage 33 and the second oil passage 34 toward the reservoir tank 56 side such that the pressure in the hydraulic circuit 30 is not larger than or equal to a predetermined value. The relief passage 38 has a first relief passage 38a, a second relief passage 38b, and a third relief passage 38c.

The first relief passage 38a and the second relief passage 38b are oil passages branched from the first port-side oil passage 33a and the second port-side oil passage 34a, respectively. Specifically, a first end side of the first relief passage 38a is connected to the first port-side oil passage 33a, and a second end side thereof is connected to a second end side of the second relief passage 38b. Meanwhile, a first end side of the second relief passage 38b is connected to the second port-side oil passage 34a, and the second end side thereof is connected to the second end side of the first relief passage 38a.

A check valve 45a is provided in the first relief passage 38a. An inflow end of the check valve 45a is connected to the first port-side oil passage 33a side, and an outflow end is connected to the third relief passage 38c side. That is to say, in the first relief passage 38a, the check valve 45a is provided so as to allow the pressure oil to flow from the first port-side oil passage 33a side to the third relief passage 38c side, while restricting a flow of the pressure oil from the third relief passage 38c side to the first port-side oil passage 33a side.

A check valve 45b is provided in the second relief passage 38b. An inflow end of the check valve 45b is connected to the second port-side oil passage 34a side, and an outflow end is connected to the third relief passage 38c side. That is to say, in the second relief passage 38b, the check valve 45b is provided so as to allow the pressure oil to flow from the second port-side oil passage 34a side to the third relief passage 38c side, while restricting a flow of the pressure oil from the third relief passage 38c side to the second port-side oil passage 34a side.

A first end side of the third relief passage 38c is connected to a connecting portion between the first relief passage 38a and the second relief passage 38b, and a second end side thereof is connected to the upstream side of the accumulator 46 in the oil discharge passage 32.

The relief valve 47 is provided in the third relief passage 38c. Specifically, an inflow side of the relief valve 47 is connected to the third relief passage 38c on the first relief passage 38a and second relief passage 38b side, and an outflow side thereof is connected to the third relief passage 38c on the reservoir tank 56 side. The relief valve 47 is configured to bring the third relief passage 38c into communication if the pressure in a portion of the third relief passage 38c on the upstream side of the relief valve 47 is larger than or equal to predetermined pressure.

A first branch passage 39a and a second branch passage 39b are formed in a portion of the third relief passage 38c on the downstream side of the relief valve 47. A first end side of the first branch passage 39a is connected to a portion of the third relief passage 38c on the downstream side of the relief valve 47, and a second end side thereof is connected to the first port-side oil passage 33a. Meanwhile, a first end side of the second branch passage 39b is connected to a portion of the third relief passage 38c on the downstream side of the relief valve 47, and a second end side thereof is connected to the second port-side oil passage 34a.

A check valve 45c is provided in the first branch passage 39a. An inflow end of the check valve 45c is connected to the first branch passage 39a on the third relief passage 38c side, and an outflow end is connected to the first branch passage 39a on the first port-side oil passage 33a side. That is to say, in the first branch passage 39a, the check valve 45c is provided so as to allow the pressure oil to flow from the third relief passage 38c side to the first port-side oil passage 33a side, while restricting a flow of the pressure oil from the first port-side oil passage 33a side to the third relief passage 38c side.

A check valve 45d is provided in the second branch passage 39b. An inflow end of the check valve 45d is connected to the second branch passage 39b on the third relief passage 38c side, and an outflow end is connected to the second branch passage 39b on the second port-side oil passage 34a side. That is to say, in the second branch passage 39a, the check valve 45d is provided so as to allow the pressure oil to flow from the third relief passage 38c side to the second port-side oil passage 34a side, while restricting a flow of the pressure oil from the second port-side oil passage 34a side to the third relief passage 38c side.

Switching Mechanism

The hydraulic circuit 30 includes a switching mechanism 50. The switching mechanism 50 has the control unit 51, as well as the aforementioned first oil passage 33, second oil passage 34, drive control valve 40, mode switching valve 41, and electromagnetic valve 42.

The control unit 51 is provided as an actuator controller for switching the positions of the drive control valve 40, the mode switching valve 41, and the electromagnetic valve 42, based on the notification signals Sg1 and Sg2 received from the aforementioned sensors 27a, 27h, 27c, and 48, a command from a flight controller (not shown), or the like.

The switching mechanism 50 is configured to be able to be switched between a first state where the pressure oil is supplied to the first pressure chamber S1 and a second state where the pressure oil is supplied to the second pressure chamber S2, respectively by switching the drive control valve 40 to the first position 40a and by switching the drive control valve 40 to the second position 40b.

Operations of Actuator Unit

The actuator unit 1 according to the present embodiment operates in three modes, namely the electric mode, the hydraulic mode, and the bypass mode. Operations of the actuator unit 1 in the respective modes will be described below.

Operations of Actuator Unit in Electric Mode

The actuator unit 1 operates in the electric mode in a normal operation state, or more specifically, when a jammed state has not occurred in the screw mechanism 10 and the hydraulic circuit 30 is normally operating. At this time, the notification signals Sg1 and Sg2 are not transmitted from the jammed state detection sensor 27a and the pressure sensor 48 to the control unit 51.

In the electric mode, the control unit 51 excites the electromagnetic valve 42. The electromagnetic valve 42 is thereby switched to the oil supply position 42a, and accordingly the pressure oil is supplied to the pilot pressure chamber 41c of the mode switching valve 41. The mode switching valve 41 is thereby switched to the supply/discharge position 41a (see FIG. 3).

Then, in the electric mode, the actuator unit 1 operates as a result of the electric motor 4 being driven in a state where the hydraulic circuit 30 is controlled such that the piston portion 20 is at a predetermined position in the housing 3.

FIG. 3 is a diagram showing an exemplary state of the actuator unit 1 in the electric mode. Specifically, FIG. 3 is a diagram showing a state where, in the electric mode, the drive control valve 40 is located at the neutral position 40*c*. In the electric mode, as mentioned above, the hydraulic circuit 30 is controlled such that the piston portion 20 is at the predetermined position in the housing 3.

If the piston portion 20 is located at the predetermined position, the control unit 51 transmits a command to switch the drive control valve 40 to the neutral position 40*c*, to the drive control valve 40. The drive control valve 40 is thereby switched to the neutral position 40*c*, and accordingly both the oil supply from the hydraulic pump 55 to the electromechanical actuator 2 via the drive control valve 40 and the oil discharge from the electromechanical actuator 2 to the reservoir tank 56 are restricted.

If, from this state, the piston portion 20 moves rearward for some reason, the control unit 51 transmits a command to switch the drive control valve 40 to the first position 40*a*, to the drive control valve 40. The drive control valve 40 is then switched from the neutral position 40*c* shown in FIG. 3 to the first position 40*a* shown in FIG. 5.

Figure 5:
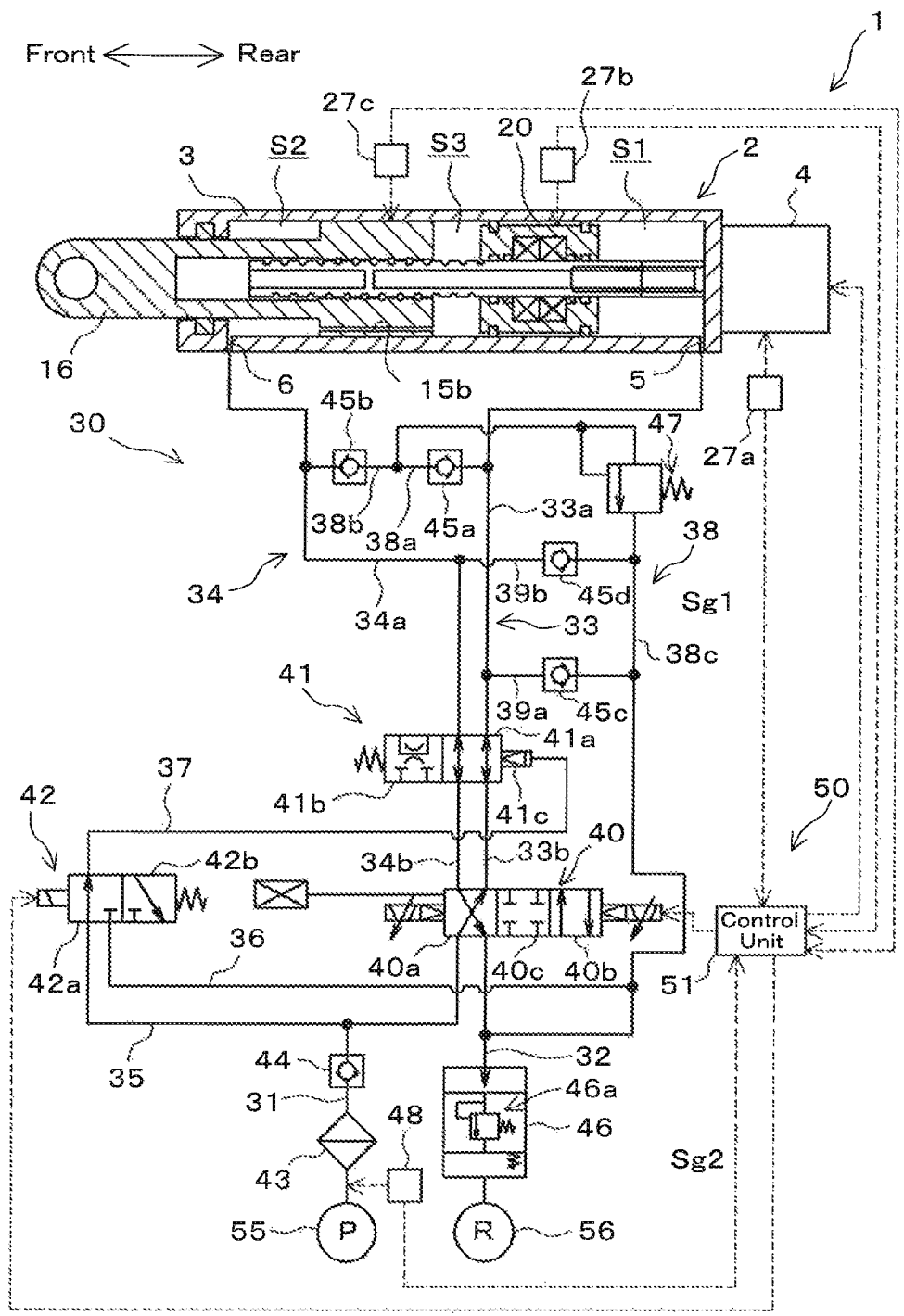
FIG. 5 is a diagram showing an exemplary state of the actuator unit in the electric mode or the hydraulic mode, and is a diagram for illustrating a state of a hydraulic circuit when operating an output portion in a direction of advancing from a housing.

Then, as shown in FIG. 5, the first state is achieved where the oil supply passage 31 and the first oil passage 33 are in communication with each other, and the oil discharge passage 32 and the second oil passage 34 are in communication with each other. Accordingly, the pressure oil ejected from the hydraulic pump 55 is supplied to the first pressure chamber S1 through the oil supply passage 31, the first oil passage 33, and the first port 5 in this order. On the other hand, the pressure oil in the second pressure chamber S2 is conveyed to the accumulator 46 through the second port 6, the second oil passage 34, and the oil discharge passage 32 in this order.

Upon the pressure oil being supplied to the first pressure chamber S1, the pressure in the first pressure chamber S1 increases, and accordingly the rear end face of the piston portion 20 is pressed forward. The piston portion 20 thereby moves forward, and therefore the piston portion 20 can be returned to the predetermined position in the housing 3. Note that, at this time, the pressure oil in the third pressure chamber S3 is discharged to the outside of the electromechanical actuator 2 via the communication path 15*b*, the second pressure chamber S2, and the second port 6, and accordingly the piston portion 20 smoothly moves forward. Upon the piston portion 20 returning to the predetermined position, the drive control valve 40 is switched to the neutral position 40*c* by the control unit 51, and the piston portion 20 is fixed to the predetermined position.

On the other hand, if the piston portion 20 moves forward from a state of being located at the predetermined position for some reason, the control unit 51 transmits a command to switch the drive control valve 40 to the second position 40*b*, to the drive control valve 40. The drive control valve 40 is then switched from the neutral position 40*c* shown in FIG. 3 to the second position 40*b* shown in FIG. 6.

Figure 6:
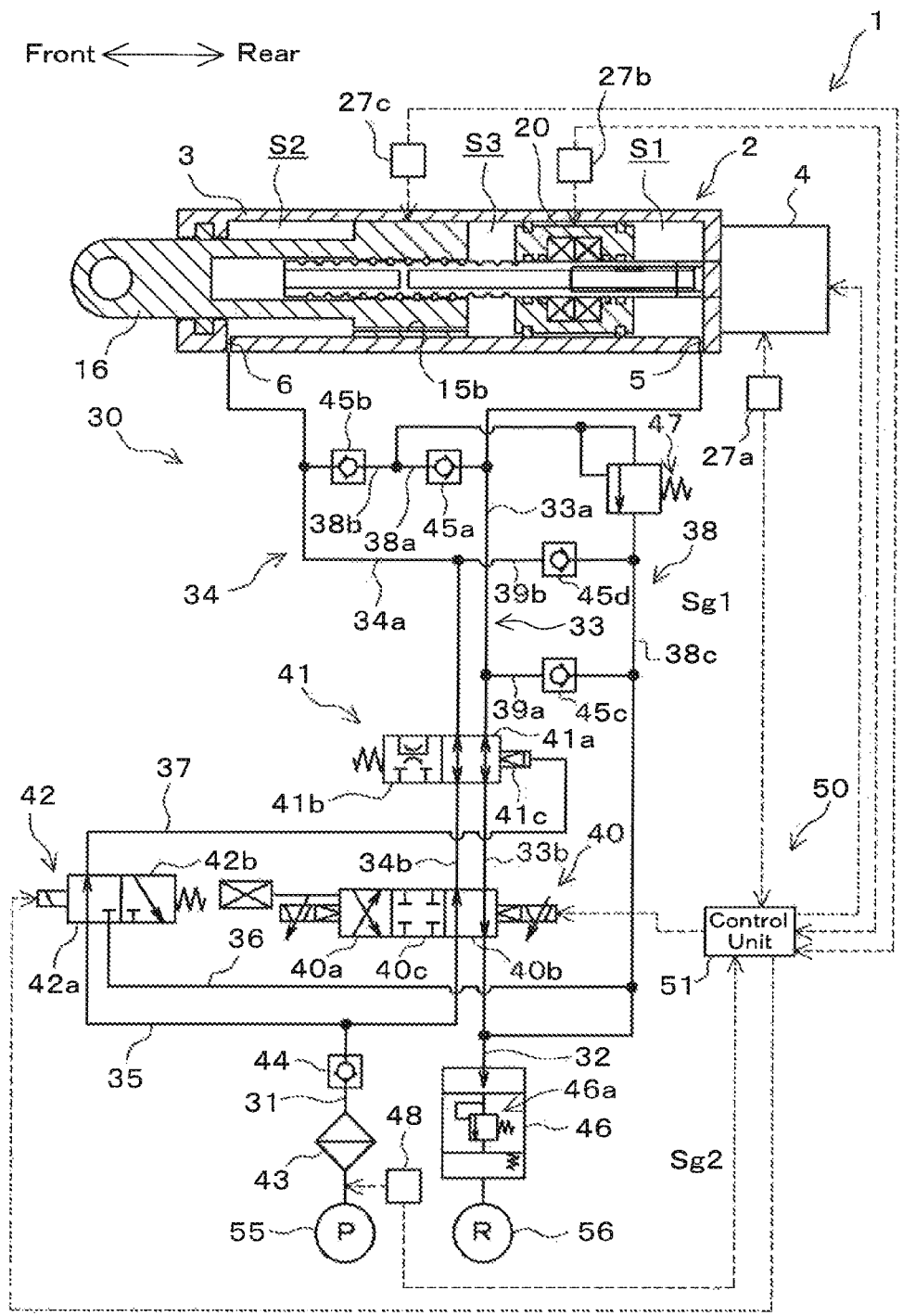
FIG. 6 is a diagram showing an exemplary state of the actuator unit in the electric mode or the hydraulic mode, and is a diagram for illustrating a state of the hydraulic circuit when operating the output portion in a direction of withdrawing to the housing.

Then, as shown in FIG. 6, the second state is achieved where the oil supply passage 31 and the second oil passage 34 are in communication with each other, and the oil discharge passage 32 and the first oil passage 33 are in communication with each other. Accordingly, the pressure oil ejected from the hydraulic pump 55 is supplied to the second pressure chamber S2 through the oil supply passage 31, the second oil passage 34, and the second port 6 in this order. On the other hand, the pressure oil in the first pressure chamber S1 is conveyed to the accumulator 46 through the first port 6, the first oil passage 33, and the oil discharge passage 32 in this order.

Upon the pressure oil being supplied to the second pressure chamber S2, the pressure in the third pressure chamber S3 that is in communication with the second pressure chamber S2 via the communication path 15*b* increases, and accordingly the front end face of the piston portion 20 is pressed rearward. The piston portion 20 thereby moves rearward, and therefore the piston portion 20 can be returned to the predetermined position in the housing 3. Note that, at this time, the pressure oil in the first pressure chamber S1 is discharged to the outside of the electromechanical actuator 2 via the first port 5, and accordingly the piston portion 20 smoothly moves rearward. Upon the piston portion 20 returning to the predetermined position, the drive control valve 40 is switched to the neutral position 40*c* by the control unit 51, and the piston portion 20 is fixed to the predetermined position.

In the electric mode, the electric motor 4 is driven to rotate in a state where the piston portion 20 is retained at the predetermined position in the housing 3, as described above. Then, the first screw 11, which is connected to the output shaft 4*a* by ball spline coupling, also rotates. The rotational force of the first screw 11 is then transmitted to the second screw 12 connected thereto by the ball screw mechanism, and accordingly the second screw 12 (i.e., the output portion 16) is displaced in the axial direction. The moving surface 102 can thereby be driven with respect to the wing 101.

Note that, in the electric mode, the control unit 51 controls the position of the output portion 16, based on a command from the flight controller and the front-rear position of the output portion 16 detected by the second linear sensor 27*c*. Specifically, the control unit 51 drives the electric motor 4 such that the front-rear position of the output portion 16 coincides with a command value from the flight controller.

Operations of Actuator Unit in Hydraulic Mode

As described above, in the normal operation state, the actuator unit 1 operates in the electric mode. That is to say, the electromechanical actuator 2 operates as a result of the screw mechanism 10 functioning. However, if the screw mechanism 10 enters a jammed state and the first screw 11 and the second screw 12 cease to relatively rotate, the electromechanical actuator 2 becomes unable to be driven in the electric mode. In this regard, in the actuator unit 1 according to the present embodiment, even if the screw mechanism 10 enters a jammed state, the output portion 16 can be advanced and withdrawn with respect to the housing 3 by the actuator unit 1 operating in the hydraulic mode.

In the hydraulic mode, the control unit 51 excites the electromagnetic valve 42, as in the electric mode. The electromagnetic valve 42 is thereby switched to the oil supply position 42*a*, and accordingly the pressure oil is supplied to the pilot pressure chamber 41*c* of the mode switching valve 41. The mode switching valve 41 is thereby switched to the supply/discharge position 41*a*.

Upon the screw mechanism 10 entering a jammed state, the jammed state detection sensor 27*a* detects the jammed state of the screw mechanism 10 and transmits the notification signal Sg1 to the control unit 51. The control unit 51 that receives the notification signal Sg2 appropriately switches the position of the drive control valve 40 in accordance with a command from the flight controller. Specifically, the control unit 51 switches the drive control valve 40 to the first position 40*a* (see FIG. 5) when moving the output portion 16 forward, switches the drive control valve 40 to the second position 40*b* (see FIG. 6) when moving the output portion 16 rearward, and switches the drive control valve 40 to the neutral position 40*c* (see FIG. 3) when maintaining the position of the output portion 16 in the front-rear direction. The electromechanical actuator 2 can thereby be appropriately driven by the oil pressure.

Note that, in the hydraulic mode, the control unit 51 controls the position of the output portion 16 based on a command from the flight controller and the front-rear position of the piston portion 20 with respect to the housing 3 detected by the second linear sensor 27*b*. Specifically, the control unit 51 appropriately switches the position of the drive control valve 40 such that the front-rear position of the piston portion 20 detected by the second linear sensor 27*h* coincides with a command value from the flight controller.

Operations of Actuator Unit in Bypass Mode

Figure 7:
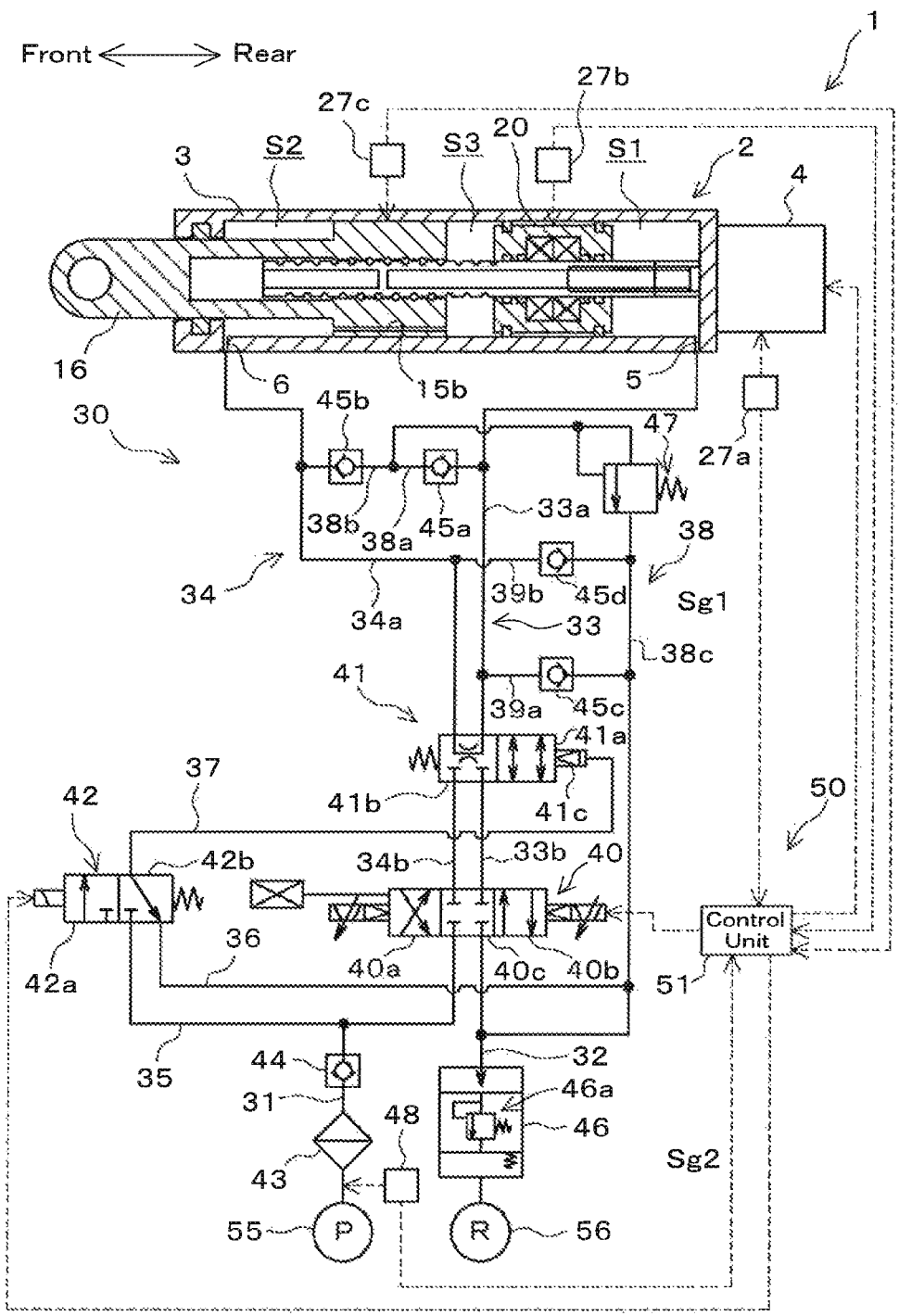
FIG. 7 is a diagram showing an exemplary state of the actuator unit in a bypass mode.

FIG. 7 is a diagram showing an exemplary state of the actuator unit in the bypass mode. If the screw mechanism 10 enters a jammed state and the hydraulic circuit 30 ceases to normally operate (specifically, if the pressure ejected from the hydraulic pump 55 is smaller than or equal to the predetermined value) in the actuator unit 1, the actuator unit 1 operates in the bypass mode.

Specifically, if the screw mechanism 10 enters a jammed state and the hydraulic circuit 30 ceases to normally operate, the jammed state detection sensor 27*a* transmits the notification signal Sg1 to the control unit 51, and the pressure sensor 48 transmits the notification signal Sg2 to the control unit 52.

The control unit 51 that receives the two notification signals Sg1 and Sg2 demagnetizes the electromagnetic valve 42. The electromagnetic valve 42 is then switched to the oil discharge position 42*b* (see FIG. 7), and accordingly the pressure oil in the pilot pressure chamber 41*c* of the mode switching valve 41 is discharged. The mode switching valve 41 is thereby switched to the bypass position 41*b*.

When the mode switching valve 41 is switched to the bypass position 41*b*, the first pressure chamber 51 and the second pressure chamber S2 are in communication with each other via the first port-side oil passage 33*a* and the second port-side oil passage 34*a*. As a result, the output portion 16 of the electromechanical actuator 2 achieves a state of being able to advance and withdraw with respect to the housing 3.

Specifically, as an example, if the moving surface 102 is operated by an actuator other than the actuator unit 1, the output portion 16 of the electromechanical actuator 2 attempts to advance and withdraw with respect to the housing 3 so as to follow the movement of the other actuator unit. At this time, the pressure oil is conveyed from one of the pressure chambers S1 and S2 to the other one of the pressure chambers S2 and S1 via the first port-side oil passage 33*a* and the second port-side oil passage 34*a*. With this configuration, even if a malfunction occurs in both the electric system and the hydraulic system, the output portion 16 of the electromechanical actuator 2 can be advanced and withdrawn with respect to the housing 3, without the output portion 16 being fixed to a certain state.

Note that, if an excessive load is applied to the output portion 16 (i.e., if the output portion 16 is overloaded) in the actuator unit 1, the actuator unit 1 operates in the bypass mode. It is thereby possible to prevent breakage of the screw mechanism 10 or the like in the electromechanical actuator 2 due to the excessive load exerted on the output portion 16.

Effects

As described above, in the electromechanical actuator 2 according to the present embodiment, upon the electric motor 4 being driven, the first screw 11 serving as a drive portion also rotates due to the rotational force thereof. Then, this rotational force is transmitted to the second screw 12 serving as a driven portion, and accordingly the output portion 16 provided in the second screw 12 advances and withdraws in the linear direction. The moving surface 102 connected to the output portion 16 can thereby be driven.

In the electromechanical actuator 2, the piston portion 20 advances and withdraws with respect to the housing 3 due to the pressure of a fluid (in the present embodiment, pressure oil) supplied to and discharged from the housing 3. Specifically, the piston portion 20 is controlled so as to be at the predetermined position with respect to the housing 3, by the pressure in the first pressure chamber S1 and the pressure in the third pressure chamber S3 being adjusted. With this operation, the position of the first screw 11 in the axial direction with respect to the housing 3 is uniquely defined, and accordingly the position of the output portion 16 in the advancing and withdrawing direction can be calculated by detecting, using the second linear sensor 27*c*, the front-rear position of the output portion 16 with respect to the first screw 11. The position of the output portion 16 in the advancing and withdrawing direction can thereby be controlled.

As described above, if the first screw 11 is driven to rotate by the electric motor 4 in a state where the piston portion 20 is controlled so as to be at the predetermined position in the housing 3, the second screw 12 relatively rotates with respect to the first screw 11 and is thereby relatively displaced in the axial direction. The output portion 16 can thereby be moved to a desired position with respect to the housing 3, and accordingly the moving surface 102 connected to the output portion 16 can be driven so as to achieve a desired state.

In the electromechanical actuator 2, even if a jammed state occurs in the screw mechanism 10 serving as a conversion mechanism portion and the first screw 11 and the second screw 12 become unable to relatively rotate, the first screw 11 and the second screw 12 in a state of being integrated with each other can be advanced and withdrawn with respect to the housing 3 by means of the pressure of the pressure oil. Specifically, if a jammed state occurs in the screw mechanism 10, the pressure oil can be supplied to the first pressure chamber S1 via the first port 5, or the pressure oil can be supplied to the second pressure chamber S2 via the second port 6.

Upon the pressure oil being supplied to the first pressure chamber S1, the piston portion 20 is pressed and displaced toward the output portion 16 side. Then, the second screw 12 is also displaced in the same direction together with the piston portion 20 and the first screw 11. The output portion 16 thereby advances so as to project from the housing 3. On the other hand, upon the pressure oil being supplied to the second pressure chamber S2, the second screw 12 is pressed toward the piston portion 20 side. The output portion 16 thereby withdraws toward the housing 3 side. Note that, at this time, the piston portion 20 is moved in the withdrawing direction by the first screw 11 that is displaced together with the second screw 12 toward the piston portion 20 side.

Accordingly, with the electromechanical actuator 2, it is possible to provide an electromechanical actuator in which the output portion 16 can be advanced and withdrawn with respect to the housing 3 even if a jammed state occurs in the screw mechanism 10. Moreover, this advancing and withdrawing operation is performed by using the pressure oil as a power source, as mentioned above. Accordingly, even in a case where, for example, the electric motor 4 ceases to be driven for some reason, the aforementioned advancing and withdrawing operation is performed.

The electromechanical actuator 2 uses the following method in order to control the position of the output portion 16 in the advancing and withdrawing direction when the output portion 16 operates by means of the pressure oil. Specifically, the first linear sensor 27b that detects the front-rear position of the piston portion 20 relative to the housing 3 is provided, and the control unit 51 controls the supply and discharge of a fluid to/from the first pressure chamber S1 and the second pressure chamber S2, based on positional information of the piston portion 20 detected by the first linear sensor 27b. The position of the output portion 16 can thereby be controlled in the hydraulic mode.

Accordingly, with the electromechanical actuator 2, the actuator can be driven by using both electric power and the pressure of the pressure oil as driving sources. That is to say, with this configuration, the actuator can be driven even if a jammed state, a motor stop, or the like occurs.

In the electromechanical actuator 2, the outer circumferential side of the piston portion 20 can slide in the cylinder axis direction of the housing 3 with respect to the inner circumferential face of the housing 3, and the inner circumferential side holds the first screw 11 via the bearings 22 and 23. With this configuration, with the electromechanical actuator 2, a structure capable of rotatably supporting the first screw 11 with respect to the housing via the piston portion 20 can be appropriately configured.

The electromechanical actuator 2 is provided with the communication path 15b that brings the second pressure chamber S2 and the third pressure chamber S3 into communication with each other. With this configuration, the pressure oil supplied to and discharged from the third pressure chamber S3 can be supplied and discharged via the second pressure chamber S2 in order to perform control such that the piston portion 20 is at the predetermined position in the cylinder axis direction of the housing 3. For this reason, a port for bringing the third pressure chamber S3 into direct communication with the outside does not need to be formed in the housing, and accordingly the configuration of the housing 3 can be simplified. Furthermore, with the provision of the above-described communication path 15b, when the pressure oil accummulated in the second pressure chamber S2 is discharged to the outside of the second pressure chamber S2 in order to move the second screw 12 in the advancing direction, this pressure oil is discharged to the outside of the housing 3 via the second port 6, and is also discharged to the third pressure chamber S3 via the communication path 15b. The second screw 12 can thereby be smoothly advanced in the advancing direction.

With the electromechanical actuator 2, a configuration can be provided in which the screw mechanism 10 having the first screw 11 provided as an input screw and the second screw 12 provided as an output screw can be advanced and withdrawn with respect to the housing 3, when this screw mechanism 10 is in a jammed state.

In the electromechanical actuator 2, the first screw 11 is formed so as to be hollow, and accordingly the weight of the first screw 11 can be reduced. However, if the first screw 11 is simply formed in a tubular shape in this manner, the first pressure chamber S1 and the third pressure chamber S3 will be in communication with each other. In contrast, in the electromechanical actuator 2, the partitioning wall 11c having a wall shape that partitions the inner space of the tubular portion 11d of the first screw 11 into a space on the first pressure chamber S1 side and a space on the third pressure chamber S3 is provided within the tubular portion 11d. The first pressure chamber S1 and the third pressure chamber S3 can thereby be prevented from being in communication with each other, while suppressing an increase in the weight of the first screw 11.

With the electromechanical actuator 2, it is possible to provide an electromechanical actuator that can be driven by the conversion mechanism portion having a relatively simple configuration including the first screw 11 and the like, even if a jammed state occurs in this conversion mechanism portion, or if electric power ceases to be supplied to the electric motor 4.

In the electromechanical actuator 2, the sliding support mechanism is constituted by a ball spline mechanism, and the first screw 11 can thereby be smoothly moved in a sliding manner in the advancing and withdrawing direction with respect to the electric motor 4.

In the actuator unit 1, even if a jammed state occurs in the screw mechanism 10 or a malfunction occurs in the supply and discharge of the pressure oil to/from the housing 3, the piston portion 20 and the screw mechanism 10 can be advanced and withdrawn together with the spool portion 66 by advancing and withdrawing the spool portion 66. That is to say, with this configuration, an actuator unit having excellent redundancy can be provided.

With the actuator unit 1, the pressure oil can be selectively supplied to one of the first pressure chamber S1 and the second pressure chamber S2 in the electromechanical actuator 2 by switching the switching mechanism 50 between the first state and the second state. If the pressure oil is supplied to the first pressure chamber S1, the output portion 16 advances so as to project from the housing 3, and if the pressure oil is supplied to the second pressure chamber S2, the output portion 16 withdraws to the housing 3 side. Accordingly, with the actuator unit 1, it is possible to provide an actuator unit in which the output portion 16 can be advanced with respect to the housing 3 even if a jammed state occurs in the screw mechanism 10.

In the actuator unit 1, the position of the drive control valve 40 is switched between the first position 40a and the second position 40b by the control unit 51, and it is thereby possible to switch between the first state where the pressure oil is supplied to the first pressure chamber S1 via the first oil passage 33 and the second state where the pressure oil is supplied to the second pressure chamber S2 via the second oil passage 34. That is to say, with the actuator unit 1, the structure of the actuator unit capable of switching between the first state and the second state can be appropriately configured.

In the actuator unit 1, the mode switching valve 41 can be switched between the supply/discharge position 41a and the bypass position 41b. As a result of switching the mode switching valve 41 to the supply/discharge position 41a, a state can be achieved where the pressure oil can be supplied from the hydraulic pump 55 to the first pressure chamber S1 or the second pressure chamber S2. On the other hand, as a result of switching the mode switching valve 41 to the bypass position 41b, the first port-side oil passage 33a and the second port-side oil passage 34a can be brought into communication with each other. Then, even if the screw mechanism 10 enters a jammed state and the hydraulic circuit 30 ceases to operate, the pressure oil in one of the first pressure chamber S1 and the second pressure chamber S2 can be caused to flow into the other one of the first pressure chamber S1 and the second pressure chamber S2. Accordingly, the output portion 16 can be prevented from being fixed to a certain position with respect to the housing 3, and a state can be achieved where the output portion 16 can be advanced and withdrawn with respect to the housing 3.

With the actuator unit 1, even if an overload occurs in the electromechanical actuator 2, the mode switching valve 41 can be switched to the bypass position 41b as in the aforementioned case. It is thereby possible to prevent breakage of the screw mechanism 10 or the like in the electromechanical actuator 2 due to the excessive load exerted on the output portion 16.

Although an embodiment of the present invention has been described above, the present invention is not limited to the above embodiment, and various modifications may be implemented within the scope recited in the claims. For example, the following modifications may be implemented.

Figure 8:
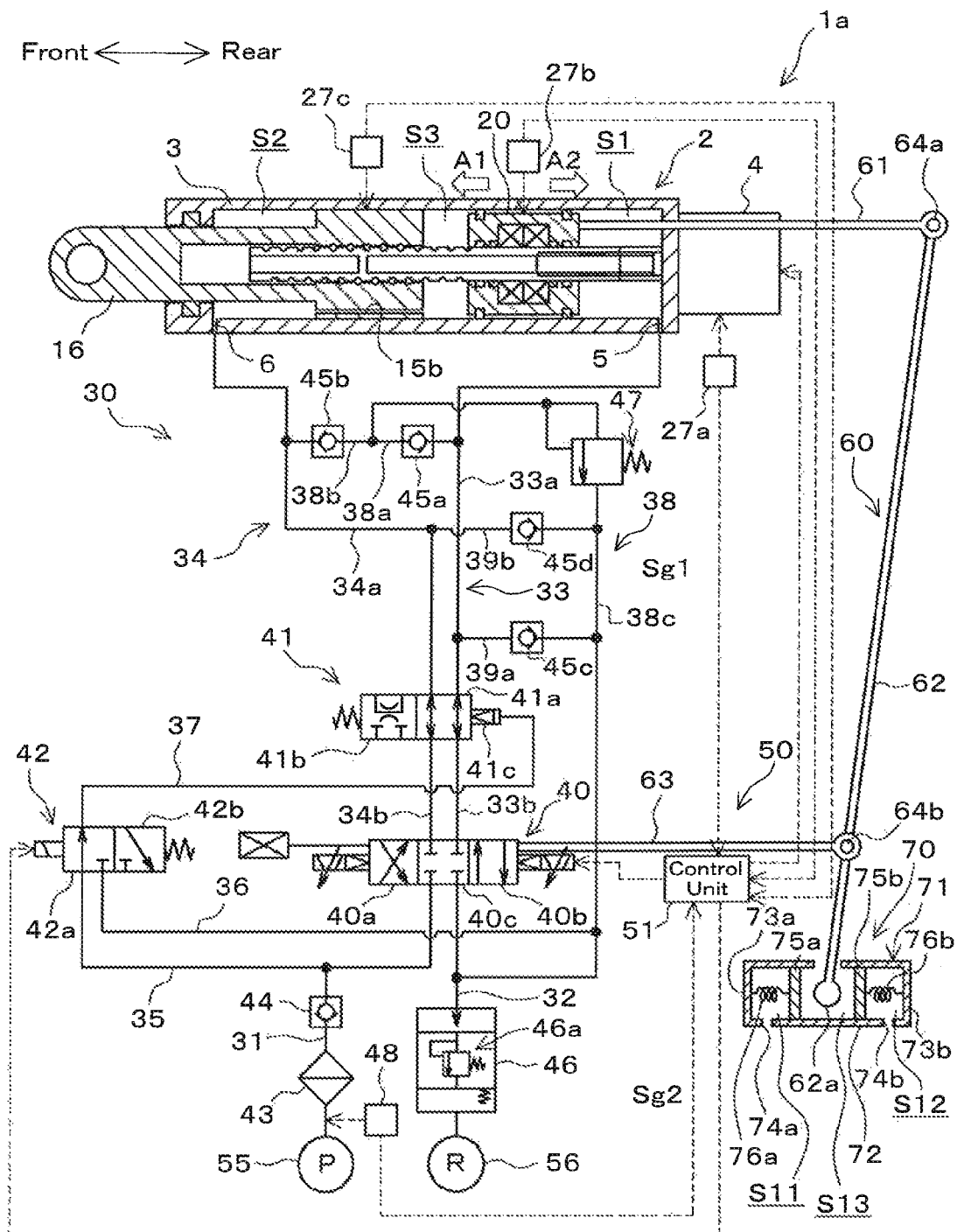
FIG. 8 is a diagram schematically showing a configuration of an actuator unit according to a modification when a link mechanism is in an unlocked state.

(1) FIG. 8 is a diagram schematically showing a configuration of an actuator unit 1a according to a modification, and showing an exemplary state of the actuator unit in the electric mode or the hydraulic mode. Unlike in the above embodiment, the actuator unit 1a according to the present modification has a configuration in which a link mechanism 60 (a connection mechanism) and a link end lock mechanism 70 are provided. The actuator unit 1a according to the present modification operates similarly as in the above embodiment in the case of the hydraulic mode and the bypass mode. Meanwhile, in the actuator unit 1a, the position of the output portion 16 can be controlled by the electric motor even if the hydraulic circuit fails in the electric mode. A description will be mainly given below of differences from the above embodiment, or more specifically, configurations and operations of the link mechanism 60 and the link end lock mechanism 70, and a description of other parts will be omitted.

First, prior to the description of the configurations of the link mechanism 60 and the link end lock mechanism 70, a configuration of the drive control valve 40 will be described.

FIG. 9 is a vertical cross-sectional diagram schematically showing a configuration of the drive control valve 40. The drive control valve 40 includes a sleeve portion 65, a spool portion 66, and a plurality of ports, as shown in FIG. 9. Note that FIG. 9 omits a pilot stage that controls the supply and discharge of pilot pressure oil to/from the drive control valve 40 based on an electric signal from the control unit 51.

The sleeve portion 65 is constituted by a member formed in a sealed manner and having an approximately cylindrical shape. As shown in FIG. 9, a pump-side first port $67_{P1}$, a second pressure chamber-side port $67_{S2}$, a reservoir tank-side port $67_R$, a first pressure chamber-side port $67_{S1}$, and a pump-side second port $67_{P2}$ are formed in this order in a cylindrical wall portion of the sleeve portion 65, from one side (front side) toward the other side (rear side) of the sleeve portion 65. The oil supply passage 31 is connected to the pump-side first port $67_{P1}$. The drive control valve-side second oil passage 34b is connected to the second pressure chamber-side port $67_{S2}$. The oil discharge passage 32 is connected to the reservoir tank-side port $67_R$. The drive control valve-side first oil passage 33b is connected to the first pressure chamber-side port $67_{S1}$. The oil supply passage 31 is connected to the pump-side second port $67_{P2}$.

The spool portion 66 is a member formed in an approximately circular column shape, and is accommodated within the sleeve portion 65 concentrically with the cylinder axis of the sleeve portion 65. The spool portion 66 has a body portion 67 extending in the front-rear direction, and first to fourth large-diameter portions 68a, 68b, 68c, and 68d that are formed in a disk shape whose outside diameter is larger than that of the body portion 67. These parts are integrally formed. The body portion 67 and the large-diameter portions 68a, 68b, 68c, and 68d are provided concentrically with one another. The first large-diameter portion 68a, the second large-diameter portion 68b, the third large-diameter portion 68c, and the fourth large-diameter portion 68d are arranged in this order at intervals in the axial direction of the body portion 67 from a first end side (front end side) toward a second end side (rear end side) of the body portion 67.

The large-diameter portions 68a, 68b, 68c, and 68d are provided so as to be able to slide in the front-rear direction with respect to the inner circumferential face of the sleeve portion 65. The first large-diameter portion 68a can block the pump-side first port $67_{P1}$ from the inside of the sleeve portion 65. The second large-diameter portion 68b can block the reservoir tank-side port $67_R$ from the inside of the sleeve portion 65. The third large-diameter portion 68c can block the pump-side second port $67_{P2}$ from the inside of the sleeve portion 65.

Also, an end portion of the third link member 63 is rotatably connected with respect to the spool portion 66, in a rear end portion of the spool portion 66 (i.e., a rear end portion of the fourth large-diameter portion 68d). With this configuration, with a displacement of the third link member 63 in the front-rear direction, the spool portion 66 is also displaced in the front-rear direction.

If the spool portion 66 is displaced forward from a state (neutral position) shown in FIG. 9A and enters a state shown in FIG. 9B, in the sleeve portion 65, the oil supply passage 31 and the drive control valve-side second oil passage 34b are brought into communication with each other, and the oil discharge passage 32 and the drive control valve-side first oil passage 33b are brought into communication with each other. That is to say, the state shown in FIG. 9B is a state where the drive control valve 40 is located at the second position 40b. On the other hand, if the spool portion 66 is displaced forward from the neutral position shown in FIG. 9A and enters a state shown in FIG. 9C, in the sleeve portion 65, the oil supply passage 31 and the drive control valve-side first oil passage 33b are brought into communication with each other, and the oil discharge passage 32 and the drive control valve-side second oil passage 34b are brought into communication with each other. That is to say, the state shown in FIG. 9C is a state where the drive control valve 40 is located at the first position 40a.

Configurations of Link Mechanism and Link End Lock Mechanism

As shown in FIG. 8, the link mechanism 60 has a first link member 61, a second link member 62, and a third link member 63. The link members 61, 62, and 63 are each constituted by a linearly extending rod-like member.

The first link member 61 is arranged so as to extend parallel with the first screw 11, in a state of passing through the bottom portion 3b of the housing 3. A first end side of the first link member 61 is rotatably fixed to the piston portion 20, and a second end side thereof is pivotably connected to a first end side of the second link member 62 via a connecting pin 64a.

The first end side of the second link member 62 is connected to the first link member 61 via the connecting pin 64a, and a second end side thereof is accommodated in a cylinder 71 of the link end lock mechanism 70, the details of which will be described later. A second end portion of the second link member 62 is provided as a ball portion 62a formed in a ball shape. The second link member 62 is provided so as to intersect the first link member 61. Specifically, in the present embodiment, the second link member 62 intersects the first link member 61 at an angle of about 80 to 90 degrees.

The third link member 63 is provided so as to extend parallel with the extending direction of the first link member 61. A first end side of the third link member 63 is connected to an intermediate portion of the second link member 62 via a connecting pin 64b, and a second end side thereof is rotatably fixed to the spool portion 66 of the drive control valve 40. The third link member 63 is arranged so as to extend in the switching direction (the front-rear direction in FIG. 8) of the drive control valve 40.

The link end lock mechanism 70 is configured to be able to be switched between a locked state where the ball portion 62a is fixed and an unlocked state where the locked state of the ball portion 62a is canceled. The link end lock mechanism 70 has the cylinder 71, a pair of pistons 75a and 75b, and a pair of tension springs 76a and 76b.

The cylinder 71 has a cylindrical wall portion 72 formed in a cylindrical shape, and a first bottom portion 73a and a second bottom portion 73b that are provided so as to cover opening portions of the cylindrical wall portion 72 in the cylinder axis direction. These parts are integrally formed. A through hole into which the second link member 62 is inserted is formed in an intermediate portion of the cylindrical wall portion 72 in the cylinder axis direction. A first port 74a and a second port 74b are formed in a portion of the cylindrical wall portion 72 close to the first bottom portion 73a and a portion of the cylindrical wall portion 72 close to the second bottom portion 73b, respectively.

Both of the pair of pistons 75a and 75b are formed in an approximately disk shape. The pair of pistons 75a and 75b are arranged in the cylinder 71 such that the center axis of each piston is coaxial with the cylinder axis of the cylinder 71, and are provided so as to slide in the cylinder axis direction with respect to the inner circumferential face of the cylindrical wall portion 72. A first piston 75a, which serves as one of the pistons, is arranged on the first bottom portion 73a side, and a second piston 75b, which serves as the other one of the pistons, is arranged on the second bottom portion 73b side.

A space in the cylinder 71 surrounded by the cylindrical wall portion 72, the first bottom portion 73a, and the first piston 75a is provided as a first port-side space S11 that is in communication with the first port 74a. Meanwhile, a space in the cylinder 71 surrounded by the cylindrical wall portion 72, the second bottom portion 73b, and the second piston 75b is provided as a second port-side space S12 that is in communication with the second port 74b. A space in the cylinder 71 surrounded by the cylindrical wall portion 72, the first bottom portion 73a, and the second bottom portion 73b is provided as a ball portion accommodating space S13 in which the ball portion 62a is accommodated.

The pair of tension springs 76a and 76b include a first tension spring 76a and a second tension spring 76b.

The first tension spring 76a is accommodated in the first port-side space S11 in a state where a first end side of the first tension spring 76a is attached to the first bottom portion 73a and a second end side thereof is attached to the first piston 75a. The first tension spring 76a thereby biases the first piston 75a toward the first bottom portion 73a side.

The second tension spring 76b is accommodated in the second port-side space S12 in a state where a first end side of the second tension spring 76b is attached to the second bottom portion 73b and a second end side thereof is attached to the second piston 75b. The second tension spring 76b thereby biases the second piston 75b toward the second bottom portion 73b side.

The link end lock mechanism 70 is configured to be able to supply and discharge a fluid (e.g., pressure oil) to/from the spaces S11 and S12 via the respective ports 74a and 74b. If the fluid is supplied to the spaces S11 and S12 via the respective ports 74a and 74b in the link end lock mechanism 70, the pair of pistons 75a and 75b are displaced in directions of approaching each other against the biasing force of the respective tension springs 76a and 76b. At this time, the link mechanism 60 enters the locked state where the ball portion 62a is sandwiched and held by the pair of pistons 75a and 75b. On the other hand, if the fluid is discharged from the spaces S11 and S12 via the respective ports 74a and 74b in the link end lock mechanism 70, the pair of pistons 75a and 75b are displaced in directions of moving away from each other by the biasing force of the tension springs 76a and 76b. At this time, the link mechanism 60 enters the unlocked state where the ball portion 62a can be displaced in the cylinder axis direction in the ball portion accommodating space S13.

Operations of Actuator Unit

As in the above embodiment, the actuator unit 1a according to the present modification operates in three modes, namely the electric mode, the hydraulic mode, and the bypass mode. The operations in the hydraulic mode and the bypass mode among these modes are the same as those in the above embodiment, and accordingly a description thereof will be omitted.

Note that, when the actuator unit 1a operates in the hydraulic mode or the bypass mode, a fluid is not supplied to the first port-side space S11 and the second port-side space S12 in the cylinder 71 in the link end lock mechanism 70. At this time, the link mechanism 60 is in a state (unlocked state) where the ball portion 62a is not locked by the link end lock mechanism 70. When the link mechanism 60 is in the unlocked state, as shown in FIG. 8, the ball portion 62a is displaced in the cylinder 71 in the cylinder axis direction of the cylinder 71.

In the above-described state (the state shown in FIG. 8), if the piston portion 20 is displaced in the front-rear direction, the link mechanism 60 pivots around the connecting pin 64b serving as a fulcrum.

Figure 11:
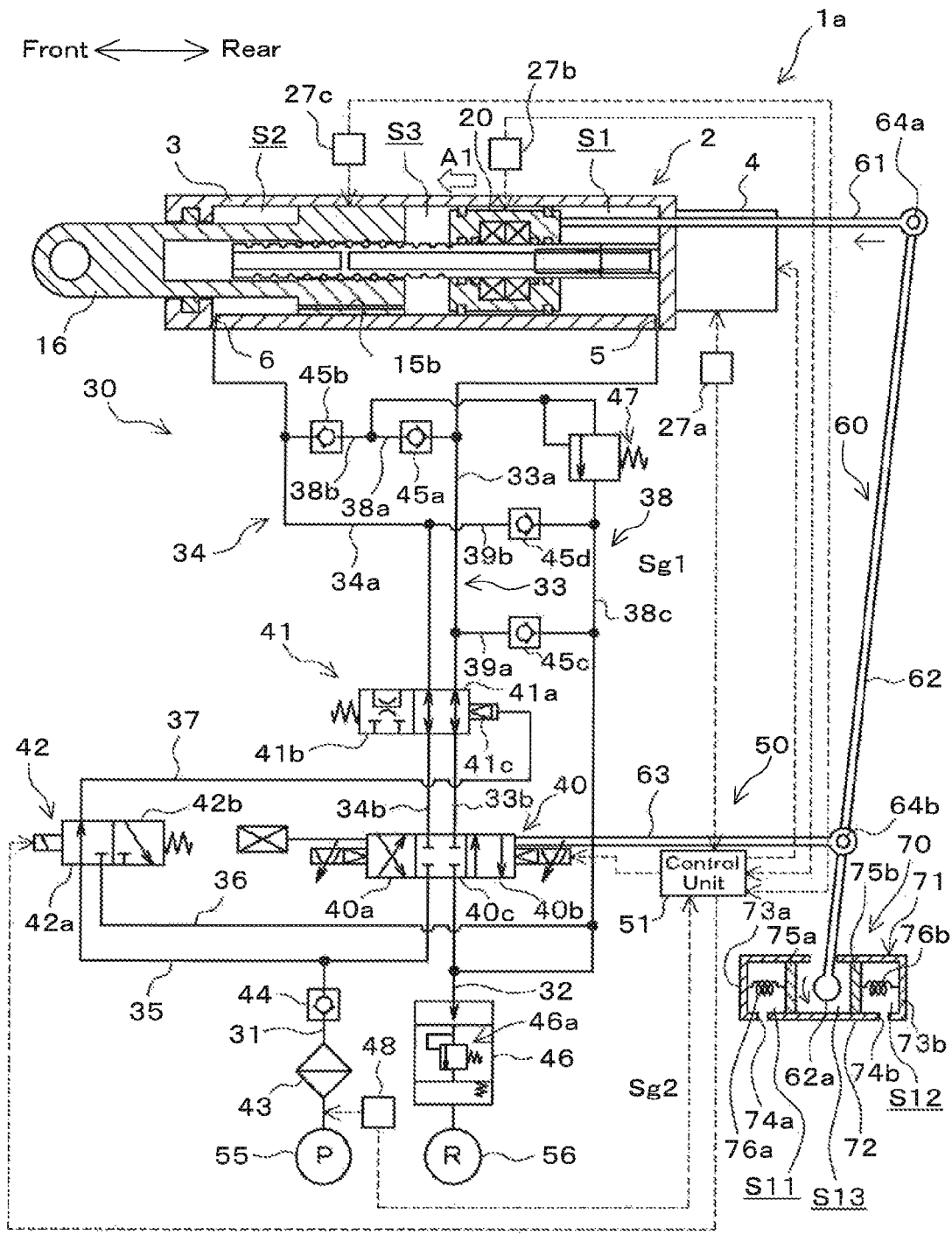
FIG. 11 is a diagram corresponding to FIG. 8, and shows a state of the actuator unit when a piston portion is displaced forward in FIG. 8.

Specifically, if the piston portion 20 is displaced forward (i.e., if the piston portion 20 moves in the direction of arrow A1 in FIG. 8), the first link member 61 and a first end portion (an end portion on the connecting pin 64a side) of the second link member 62 are also displaced forward. At this time, since the ball portion 62a that constitutes a second end portion of the second link member 62 is not sandwiched by the pair of pistons 75a and 75b, the ball portion 62a is in a state of being able to be displaced in the front-rear direction. The second link member 62 thereby rotates counterclockwise around the connecting pin 64b serving as a fulcrum, and a state shown in FIG. 11 is achieved.

Figure 12:
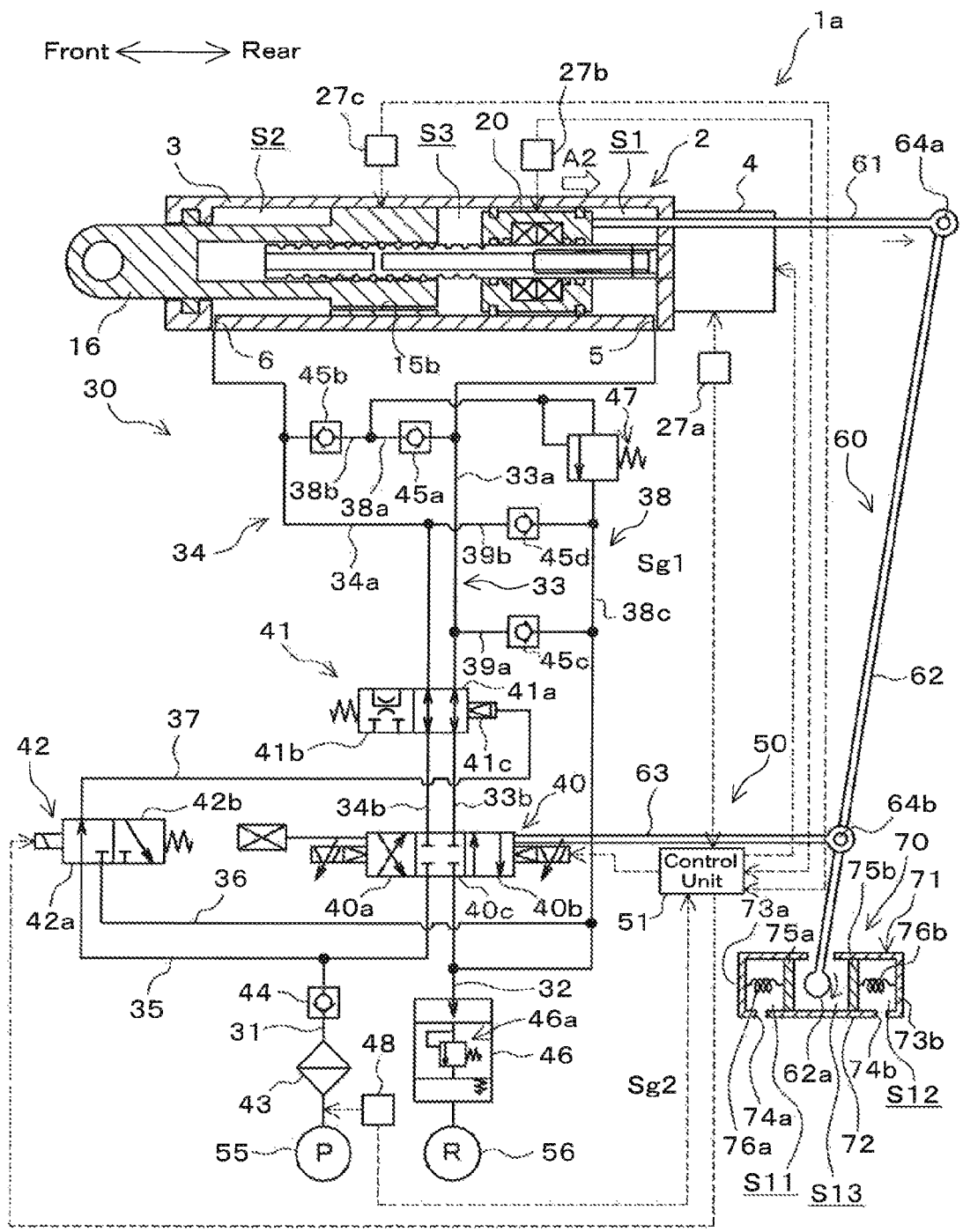
FIG. 12 is a diagram corresponding to FIG. 8, and shows a state of the actuator unit when the piston portion is displaced rearward in FIG. 8.

On the other hand, if the piston portion 20 is displaced rearward (i.e., if the piston portion 20 moves in the direction of arrow A2 in FIG. 8), the first link member 61 and the first end portion (the end portion on the connecting pin 64a side) of the second link member 62 are also displaced rearward. At this time, since the ball portion 62a that constitutes the second end portion of the second link member 62 is not sandwiched by the pair of pistons 75a and 75b, the ball portion 62a is in a state of being able to be displaced in the front-rear direction. The second link member 62 thereby rotates clockwise around the connecting pin 64b serving as a fulcrum, and a state shown in FIG. 12 is achieved.

That is to say, even if the piston portion 20 is displaced in the front-rear direction when the link mechanism 60 is in the unlocked state, this displacement is not transmitted to the drive control valve 40 via the link mechanism 60, and the position of the drive control valve 40 (the position of the spool portion 66 in the sleeve portion 65) is not displaced. In other words, when the link mechanism 60 is in the unlocked state, the displacement of the piston portion 20 in the front-rear direction is not fed back to the drive control valve 40.

Operations of Actuator Unit in the Electric Mode

The actuator unit 1a according to the modification operates in the electric mode similarly as in the above embodiment in a normal operation state, or more specifically, when a jammed state has not occurred in the screw mechanism 10 and the hydraulic circuit 30 is normally operating. At this time, the notification signals Sg1 and Sg2 are not transmitted from the jammed state detection sensor 27a and the pressure sensor 48 to the control unit 51, and operations similar to those in the above embodiment are performed. Also, at this time, a fluid is not supplied to the first port-side space S11 and the second port-side space S12, and the link mechanism 60 is in the unlocked state. Accordingly, similarly to the above-described case, the displacement of the piston portion 20 in the front-rear direction is not fed back to the drive control valve 40 at this time.

Here, in the above embodiment, the position of the output portion 16 can be controlled by the electric motor 4 being driven in a state where the hydraulic circuit normally operates such that the piston portion 20 is at the predetermined position in the housing 3. However, in the case of the above embodiment, if the drive control valve 40 or a portion of the control unit 51 that controls the drive control valve 40 fails, the piston portion 20 becomes unable to be retained at the predetermined position in the housing 3. In this case, the position of the output portion 16 cannot be controlled by the electric motor 4.

In contrast, in the actuator unit 1a according to the modification, the position of the output portion 16 can be controlled using the electric motor 4 even if the drive control valve 40 becomes unable to be electrically controlled.

Specifically, in the actuator unit 1a according to the modification, if a failure of the drive control valve 40 or the portion of the control unit 51 that controls the drive control valve 40 is detected, the link mechanism 60 enters the locked state. Specifically, the fluid is supplied to both the first port-side space S11 and the second port-side space S12 in the link end lock mechanism 70. The ball portion 62a is then sandwiched and held by the pair of pistons 75a and 75b, and accordingly the ball portion 62a is fixed with respect to the cylinder 71 (see FIG. 10). Note that, in the actuator unit 1a according to the modification, the first link member 61 and the third link member 63 are configured to have a length with which the drive control valve 40 is at the neutral position 40c when the piston portion 20 is located at the predetermined position in the case where the link mechanism 60 is in the locked state shown in FIG. 10.

Figure 10:
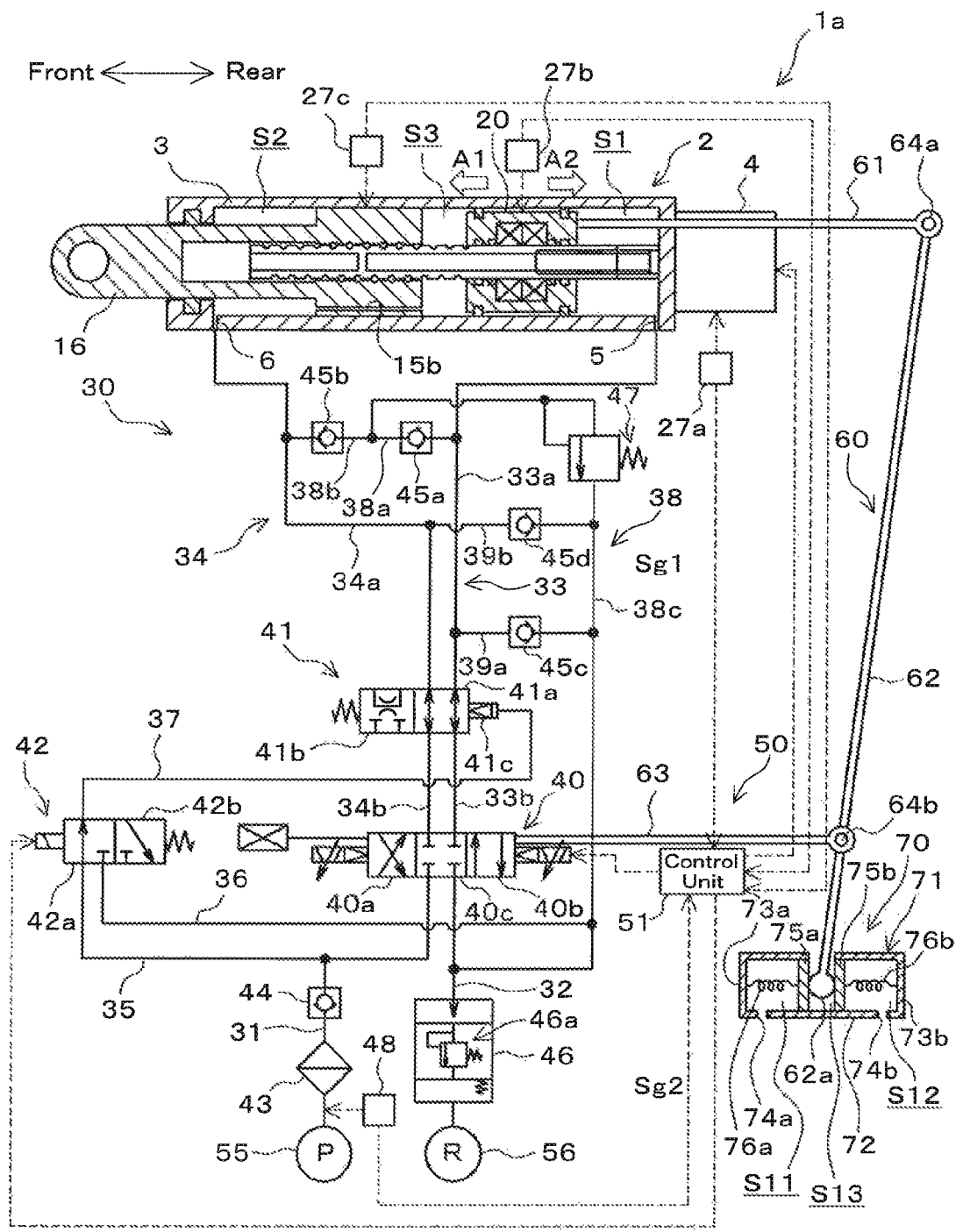
FIG. 10 is a diagram corresponding to FIG. 8, and shows a state where the link mechanism is in a locked state.
Figure 13:
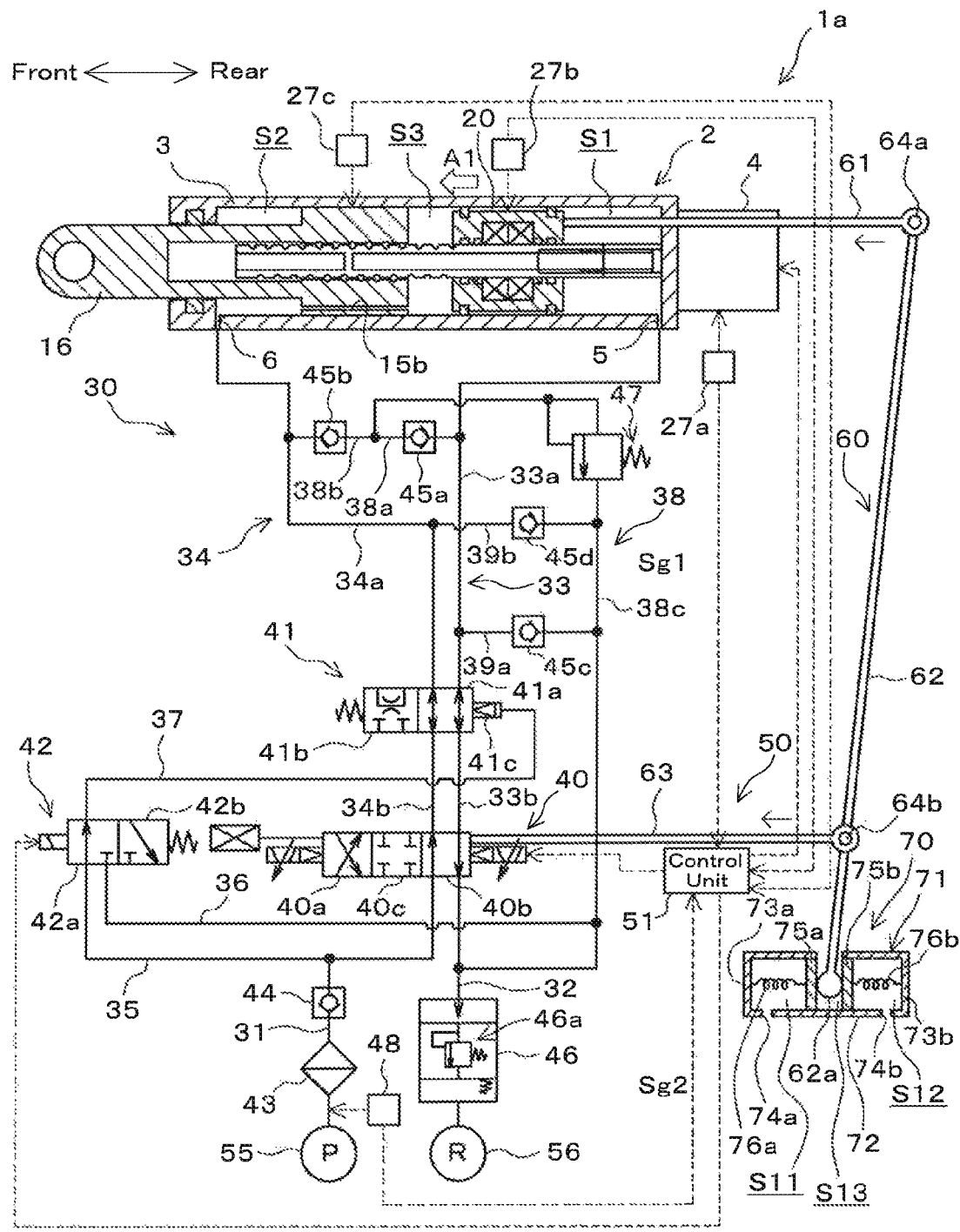
FIG. 13 is a diagram corresponding to FIG. 10, and shows a state of the actuator unit when the piston portion is displaced forward in FIG. 10.

If the piston portion 20 is displaced forward of the predetermined position (i.e., if the piston portion 20 moves in the direction of arrow A1 in FIG. 10) in the link mechanism 60 that has entered the locked state shown in FIG. 10, this displacement is fed back to the drive control valve 40. Specifically, if the piston portion 20 moves forward, the first link member 61 also moves forward therewith, and accordingly the second link member 62 rotates counterclockwise around the ball portion 62a serving as a fulcrum. As a result, the third link member 63 moves forward, and the spool portion 66 of the drive control valve 40 is also displaced forward similarly to the piston portion 20 (see FIG. 9B). The drive control valve 40 is thereby switched from the neutral position 40c to the second position 40b (see FIG. 13). Then, the pressure oil in the first pressure chamber S1 flows out toward the reservoir tank 56 side, while the pressure oil from the hydraulic pump 55 flows into the first pressure chamber S1 and the third pressure chamber S3. As a result, the piston portion 20 is displaced rearward (in the direction of arrow A2) and returns to the predetermined position, achieving a state shown in FIG. 10. At this time, the rearward displacement of the piston portion 20 is fed back to the drive control valve 40, the position of the drive control valve 40 is switched from the second position 40b to the neutral position 40c, and accordingly the inflow and outflow of the pressure oil to/from the pressure chambers S1, S2, and S3 are restricted. With this configuration, even if the piston portion 20 is displaced forward, the piston portion 20 is returned to the predetermined position and retained at this predetermined position.

Figure 14:
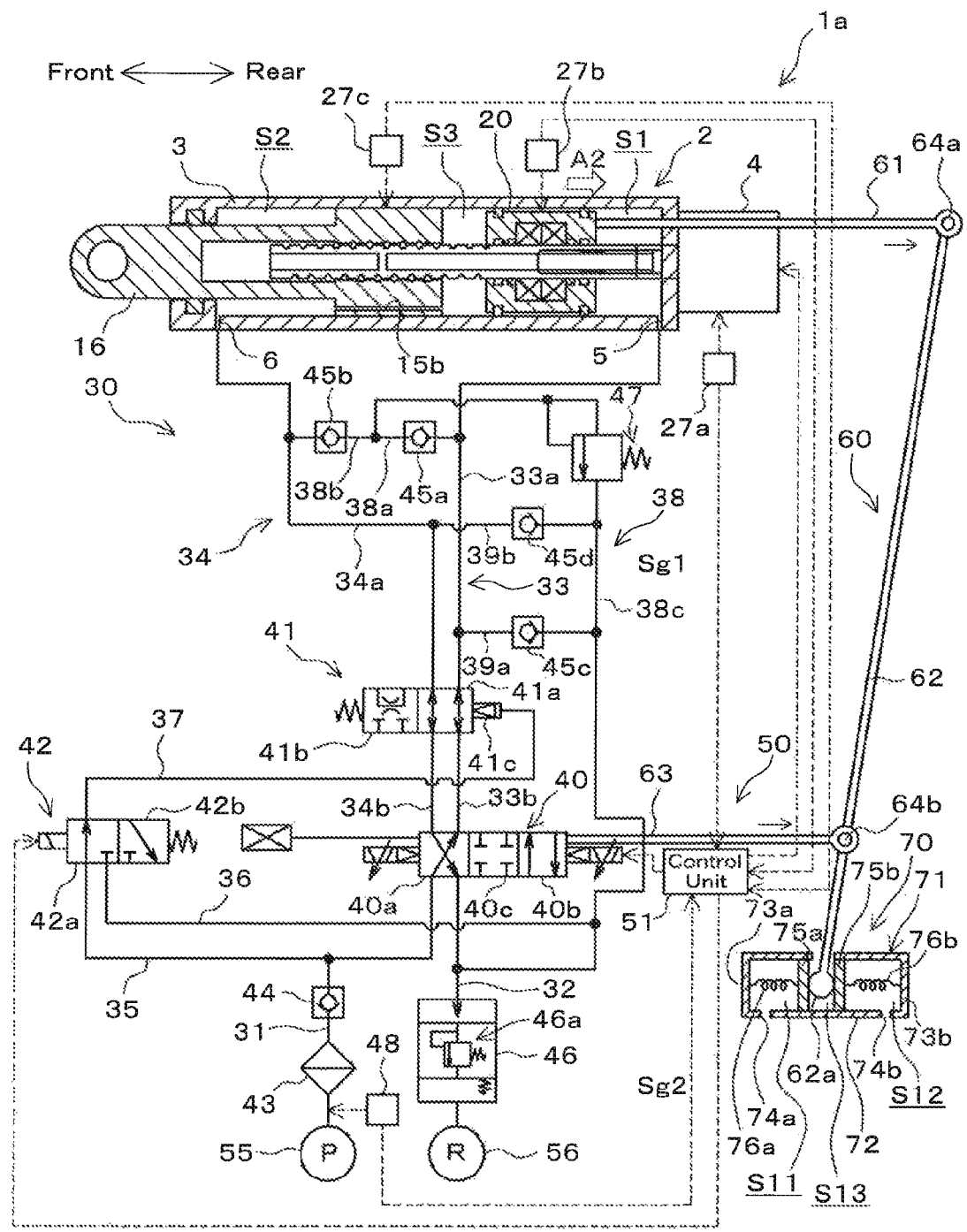
FIG. 14 is a diagram corresponding to FIG. 10, and shows a state of the actuator unit when the piston portion is displaced rearward in FIG. 10.

On the other hand, if the piston portion 20 is displaced rearward of the predetermined position in the link mechanism 60 in the locked state shown in FIG. 10 (i.e., if the piston portion 20 moves in the direction of arrow A2 in FIG. 10), this displacement is fed back to the drive control valve 40. Specifically, if the piston portion 20 moves rearward, the first link member 61 also moves rearward therewith, and accordingly the second link member 62 rotates clockwise around the ball portion 62a serving as a fulcrum. As a result, the third link member 63 moves rearward, and the spool portion 66 of the drive control valve 40 is also displaced rearward similarly to the piston portion 20 (see FIG. 9C). The drive control valve 40 is thereby switched from the neutral position 40c to the first position 40a (see FIG. 14). Then, the pressure oil in the second pressure chamber S2 and the third pressure chamber S3 flows out toward the reservoir tank 56 side, while the pressure oil from the hydraulic pump 55 flows into the first pressure chamber S1. As a result, the piston portion 20 is displaced frontward (in the direction of arrow A1) and returns to the predetermined position, achieving the state shown in FIG. 10. At this time, the frontward displacement of the piston portion 20 is fed back to the drive control valve 40, the position of the drive control valve 40 is switched from the first position 40a to the neutral position 40c, and accordingly the inflow and outflow of the pressure oil to/from the pressure chambers S1, S2, and S3 are restricted. With this configuration, even if the piston portion 20 is displaced rearward, the piston portion 20 is returned to the predetermined position and retained at this predetermined position.

Effects

As described above, with the actuator unit 1a according to the present modification, even if the hydraulic circuit 30 fails in a state where the output portion 16 is displaced by the electric motor 4, the piston portion 20 can be retained at the predetermined position in the housing 3, and accordingly the position of the output portion 16 can be continuously controlled.

With the actuator unit 1a, a configuration can be provided that enables appropriate switching between a state where a displacement of the piston portion 20 is fed back to the spool portion 66 and a state where a displacement of one of the piston portion 20 and the spool portion 66 is not fed back to the other one of the spool portion 66 and the piston portion 20. That is to say, with the actuator unit 1a, it is possible to appropriately operate an actuator unit that operates in a mode (the operation mode shown in FIGS. 11 and 12) of advancing and withdrawing the piston portion 20 by means of the pressure of the pressure oil supplied to and discharged from the housing 3, and in a mode (the operation mode shown in FIGS. 13 and 14) of advancing and withdrawing the piston portion 20 by advancing and withdrawing the spool portion 66.

In the actuator unit 1a, the link mechanism 60 can be brought into the locked state by sandwiching and holding the ball portion 62a of the link member 62, using the pair of pistons 75a and 75b. On the other hand, the link mechanism 60 can be brought into the unlocked state by the pair of pistons 75a and 75b moving away from each other, since the ball portion 62a is not sandwiched and held by the pair of pistons 75a and 75b. Accordingly, with the actuator unit 1a, a specific configuration can be provided that enables switching between the locked state and the unlocked state of the link mechanism 60. Moreover, with the actuator unit 1a, it is possible to switch between the locked state and the unlocked state by merely causing the pair of pistons 75a and 75b to approach each other or move away from each other, and accordingly an actuator unit can be provided that can be easily applied to the aforementioned respective operation modes (the operation mode shown in FIGS. 11 and 12 and the operation mode shown in FIGS. 13 and 14).

(2) Although the input screw is constituted by the first screw 11 and the output screw is constituted by the second screw 12 in the above embodiment, this need not be the case, and the input screw may be constituted by the second screw and the output screw may be constituted by the first screw.

(3) Although the above embodiment has described an exemplary mode in which the screw mechanism 10 having the first and second screws 11 and 12 is configured as a ball screw mechanism, this need not be the case. That is to say, the screw mechanism having the first and second screws may be implemented in a mode of having a configuration other than the ball screw mechanism. For example, a screw mechanism may be implemented that has a configuration in which the first screw and the second screw can be screwed together. Alternatively, the screw mechanism having the first and second screws may be implemented in a mode of having a configuration of a roller screw mechanism. In the case of a roller screw mechanism, a plurality of screw-shaped roller shafts provided with an outer circumferential helical channel will be rotatably installed between the first screw and the second screw. With the rotation of the first screw or the second screw, the roller shafts will mesh with the first screw and the second screw at the helical channel, and rotate around their axes.

(4) Although the actuator unit 1 in the above embodiment is operated in the hydraulic mode when the screw mechanism enters a jammed state, this need not be the case, and the actuator unit 1 may be operated in the hydraulic mode when the screw mechanism is normally operating.

(5) Although the output portion 16 in the above embodiment is integrally formed with the second screw 12, this need not be the case. The output portion may be provided as a member separate from the second screw, and this output portion may be connected to the second screw.

(6) Although the first screw 11 in the above embodiment is formed so as to be hollow, this need not be the case, and the first screw may be formed so as to be solid in accordance with the mechanical strength that the first screw is required to have.

(7) Although the above embodiment has described the screw mechanism 10 as a conversion mechanism portion that converts the rotational driving force of the electric motor 4 into linear motion, this need not be the case, and any kind of mechanism may be used as long as the rotational driving force of the electric motor 4 can be converted into linear motion.

The present invention is widely applicable to an electromechanical actuator that has a screw mechanism, converts rotational driving force which is output by an electric motor into linear driving force and outputs the converted driving force. The present invention is not limited to the above embodiment, and all modifications, applications, and equivalents thereof that fall within the claims, for which modifications and applications would become naturally apparent by reading and understanding the present specification, are intended to be embraced in the claims.

What is claimed is:

1. An electromechanical actuator comprising:
an electric motor directly attached to an outer surface of a cylindrical housing;
a conversion mechanism portion having a drive portion that is driven to rotate by the electric motor and a driven portion that is driven by the drive portion and advances and withdraws in a predetermined advancing and withdrawing direction, the conversion mechanism portion being accommodated in the housing;
a sliding support mechanism that is coupled to the drive portion to transmit rotational force of the electric motor to the drive portion and allows the drive portion to slide in the advancing and withdrawing direction with respect to the electric motor; and
a piston portion provided so as to be rotatable and so as to be unable to be displaced in the advancing and withdrawing direction with respect to the drive portion, the piston portion being controlled so as to be at a predetermined position in the advancing and withdrawing direction with respect to the housing by means of pressure of a fluid supplied to and discharged from the housing.

2. The electromechanical actuator according to claim 1, wherein a driven portion-side pressure chamber that is a space on a driven portion advancing direction side relative to the driven portion and to and from which the fluid is supplied and discharged, and an intermediate pressure chamber that is a space between the driven portion and the piston portion are formed in the housing, and
a communication path that brings the driven portion-side pressure chamber and the intermediate pressure chamber into communication with each other is formed in the driven portion.

3. The electromechanical actuator according to claim 1, wherein an intermediate pressure chamber that is a space between the driven portion and the piston portion, and a drive portion-side pressure chamber that is a space on a driven portion withdrawing direction side relative to the driven portion and to and from which the fluid is supplied and discharged are formed in the housing, and
the drive portion has:
a tubular portion formed in a tubular shape extending in the advancing and withdrawing direction, an inner space of the tubular portion being in communication with the drive portion-side pressure chamber through a gap formed between an inner circumferential face side of the tubular portion and a rotary shaft of the electric motor, and the inner space being in communication with the intermediate pressure chamber through a gap formed between an outer circumferential face side of the tubular portion and the driven portion; and
a partitioning wall provided inside of the tubular portion so as to partition the inner space into a space on the drive portion-side pressure chamber side and a space on the intermediate pressure chamber side.

4. The electromechanical actuator according to claim 1, wherein the conversion mechanism portion has:
an input screw provided as the drive portion;

an output screw provided as the driven portion and capable of advancing and withdrawing in the advancing and withdrawing direction with respect to the input screw; and a plurality of balls provided between a screw channel formed in the input screw and a screw channel formed in the output screw.

5. The electromechanical actuator according to claim 1, wherein the sliding support mechanism is a ball spline mechanism.

6. An actuator unit comprising:

the electromechanical actuator according to claim 1;

a spool portion that advances and withdraws in the advancing and withdrawing direction of the driven portion of the electromechanical actuator so as to switch a moving direction of the driven portion; and a connection mechanism that connects the piston portion of the electromechanical actuator and the spool portion to each other.

7. The actuator unit according to claim 6, wherein the connection mechanism has:

a first link member provided such that a first end side thereof is connected to the piston portion and extends in the advancing and withdrawing direction;

a second link member provided such that a first end side thereof is pivotably connected to a second end side of the first link member and extends in a direction of intersecting the first link member; and a third link portion provided such that a first end side thereof is fixed to the spool portion and extends in a direction in which the first link member extends, and a second end side thereof is pivotably connected to an intermediate portion of the second link member in a direction in which the second link member extends, and the actuator unit further comprises a link end lock mechanism capable of switching the connection mechanism between a locked state where a second end portion of the second link member is fixed and an unlocked state where fixation of the second end portion is canceled.

8. The actuator unit according to claim 7, wherein the link end lock mechanism has a cylinder having a tubular shape and a pair of pistons each being capable of sliding in a cylinder axis direction of the cylinder, the link end lock mechanism being configured such that the connection mechanism enters the locked state as a result of the pair of pistons sandwiching and holding the second end portion of the second link member, and such that the connection mechanism enters the unlocked state as a result of the pair of pistons moving away from each other.

9. The actuator unit according to claim 1, wherein the piston portion is directly coupled to the drive portion.

10. The actuator unit according to claim 1, wherein the piston portion is immovable in the advancing and withdrawing direction with respect to the drive portion regardless of whether the drive portion is rotated or not.

* * * * *